(12) United States Patent
Sinsel et al.

(10) Patent No.: US 7,419,560 B2
(45) Date of Patent: *Sep. 2, 2008

(54) EXTRUDED MOLTEN POLYMERIC FILM BONDING OF SOLID POLYMERIC FILM TO FLAT-ROLLED SHEET METAL CONTINUOUS STRIP

(75) Inventors: John A. Sinsel, Weirton, WV (US); Mark V. Loen, Steubenville, OH (US); Michael S. Bailey, Landenberg, PA (US)

(73) Assignee: ISG Technologies, Inc., Bethlehem, PA (US)

( * ) Notice: Subject to any disclaimer, the term of this patent is extended or adjusted under 35 U.S.C. 154(b) by 180 days.

This patent is subject to a terminal disclaimer.

(21) Appl. No.: 10/818,167

(22) Filed: Apr. 5, 2004
(Under 37 CFR 1.47)

(65) Prior Publication Data
US 2004/0197578 A1    Oct. 7, 2004

Related U.S. Application Data

(63) Continuation-in-part of application No. 10/367,371, filed on Feb. 14, 2003, which is a continuation-in-part of application No. 10/191,411, filed on Jul. 9, 2002, which is a continuation-in-part of application No. 10/156,471, filed on May 28, 2002, which is a continuation-in-part of application No. 10/156,471, filed on May 28, 2002, which is a continuation-in-part of application No. 09/767,785, filed on Jan. 23, 2001, which is a continuation-in-part of application No. 09/490,305, filed on Jan. 24, 2000.

(60) Provisional application No. 60/460,191, filed on Apr. 3, 2003.

(51) Int. Cl.
B32B 15/08    (2006.01)
B29C 47/02    (2006.01)

(52) U.S. Cl. .................... 156/244.19; 156/244.11; 156/244.18; 428/457; 428/461; 428/463

(58) Field of Classification Search ............ 156/244.11, 156/244.18, 244.19; 428/457, 461, 463
See application file for complete search history.

(56) References Cited

U.S. PATENT DOCUMENTS

| | | | | | |
|---|---|---|---|---|---|
| 4,048,355 | A | * | 9/1977 | Sakayori et al. | ............. 427/375 |
| 4,407,689 | A | * | 10/1983 | Ohtsuki et al. | ............... 156/243 |
| 4,941,935 | A | * | 7/1990 | Gregory | ..................... 156/243 |

(Continued)

Primary Examiner—Monique R. Jackson
(74) Attorney, Agent, or Firm—Berenato, White & Stavish

(57) ABSTRACT

Method steps and apparatus combinations for continuous in-line polymeric coating of rigid corrosion-protected flat-rolled sheet metal continuous-strip substrate utilizing a thermoplastic polymeric material having adhesive characteristics, capable of molten thin-film extrusion for chemical-bonding with an activated-surface of the flat-rolled sheet metal substrate, and substantially-simultaneously bonding with a solid-film polymeric material, establishing a work-product embodiment with multiple-polymer-layers traveling with the single activated surface; and, on which the solid polymeric film is selected to provide strength, hardness and other desired surface mechanical properties which also provide for external surface coloration, design, weather-proofing, and fabricating capabilities. A second embodiment provides dual-surface multiple-polymeric layer coating carried on by activating and polymeric coating one surface, at a time, of rigid corrosion-protected flat-rolled sheet metal continuous strip substrate.

24 Claims, 6 Drawing Sheets

U.S. PATENT DOCUMENTS

| | | | |
|---|---|---|---|
| 5,238,517 A * | 8/1993 | Heyes | 156/243 |
| 5,674,633 A * | 10/1997 | Saunders et al. | 428/623 |
| 5,736,086 A * | 4/1998 | Jones et al. | 264/171.17 |
| 5,919,517 A * | 7/1999 | Levendusky et al. | 427/211 |
| 5,942,285 A * | 8/1999 | Schmid et al. | 427/318 |
| 6,773,217 B2 * | 8/2004 | Sinsel et al. | 413/1 |
| 2001/0009718 A1 | 7/2001 | Sinsel et al. | |
| 2003/0031859 A1 | 2/2003 | Sinsel et al. | |
| 2003/0152788 A1 * | 8/2003 | Velliky | 428/461 |
| 2004/0022604 A1 | 2/2004 | Sinsel et al. | |
| 2005/0008881 A1 | 1/2005 | Sinsel et al. | |
| 2007/0077415 A1 | 4/2007 | Sinsel et al. | |
| 2007/0172593 A1 | 7/2007 | Sinsel et al. | |

* cited by examiner

US 7,419,560 B2

EXTRUDED MOLTEN POLYMERIC FILM BONDING OF SOLID POLYMERIC FILM TO FLAT-ROLLED SHEET METAL CONTINUOUS STRIP

RELATED APPLICATIONS

This application claims the benefit of U.S. Provisional Patent Application No. 60/460,191 filed Apr. 3, 2003; and, is a continuation-in-part of co-owned U.S. patent application Ser. No. 10/367,371 entitled "SURFACE PREPARATION AND POLYMERIC COATING OF CONTINUOUS-STRIP FLAT-ROLLED STEEL AND COATED PRODUCT" filed Feb. 14, 2003; which is a continuation-in-part of co-owned U.S. patent application Ser. No. 10/156,471 entitled "METHODS AND APPARATUS FOR SURFACE PREPARATION AND DUAL POLYMERIC LAYER COATING OF CONTINUOUS-STRIP FLAT-ROLLED SHEET METAL, AND COATED PRODUCT" filed May 28, 2002; which is a continuation-in-part of co-owned U.S. patent application Ser. No. 10/191,411 entitled "PROCESSING AND APPARATUS FOR PRODUCTION OF ENGINEERED COMPOSITE COMBINING CONTINUOUS-STRIP SHEET METAL AND THERMOPLASTIC POLYMERS", filed Jul. 9, 2002, which is a continuation-in-part of co-owned U.S. patent application Ser. No. 10/156,473 filed May 28, 2002, entitled "PROCESSING AND APPARATUS FOR PRODUCTION OF ENGINEERED COMPOSITE COMBINING CONTINUOUS-STRIP SHEET METAL AND THERMOPLASTIC POLYMERS", which was a continuation-in-part co-owned U.S. Ser. No. 09/767,785, entitled "POLYMERIC COATED METAL STRIP AND METHOD FOR PROCESSING SAME", filed Jan. 23, 2001; which was a continuation-in-part of co-owned U.S. Ser. No. 09/490,305, entitled "POLYMERIC COATED METAL AND METHOD FOR PRODUCING SAME", filed Jan. 24, 2000.

INTRODUCTION

This invention relates to continuous-line polymeric coating of elongated rigid flat-rolled sheet metal and, more particularly, is concerned with activating a surface of said sheet metal substrate for molten thermoplastic polymeric material film extrusion so as to enable bonding a solid-film polymeric material, by establishing sufficient green-strength for multiple-polymeric layer travel in continuous-line coating operations for continuous strip.

OBJECTS OF THE INVENTION

An important object integrates composite coating of corrosion-protected containment sheet metal strip with continuous-line bonding of a molten thin-film polymeric material and solid thin-film polymeric material while augmenting combinations of multiple-polymeric-layers for continuous-line polymeric coating operations.

A related object relates to selective in-line augmenting polymeric coating efficiency for work-product manufacture.

A further related object provides apparatus and processes which increase the diversity of composite-coated rigid flat-rolled sheet metal continuous-strip for market product utilization.

Another object integrates continuous-line methods and apparatus for establishing multiple-polymeric layer combinations for coating a single-planar surface of elongated rigid flat-rolled rigid flat-rolled sheet metal continuous-strip in continuous-line operations.

A related object enables intermittently shortening polymeric coating operations and polymeric coating processing steps, so as to facilitate more efficient work-product production, while providing for meeting specific market-product use requirements.

A further object integrates selective inorganic corrosion-protection of both surfaces of rigid flat-rolled sheet metal, in which the corrosion-protection is capable of responding to continuous-in-line surface activation, for enhancing chemical bonding of organic polymeric materials for augmenting market-product uses.

The above objects and other advantages and contributions of the invention are described in more detail in relation to the accompanying-drawings.

DETAILED DESCRIPTION OF THE INVENTION

A first embodiment of the invention provides continuous-line methods and apparatus for establishing multiple-polymeric layer combinations for coating a single-planar surface of corrosion-protected rigid flat-rolled sheet metal; and, a second embodiment of the invention proves the capability for separately and consecutively polymeric coating both corrosion-protected planar surfaces of elongated rigid flat-rolled sheet metal with said multiple polymeric layers in continuous-line operations.

Continuous-line coating operations are carried out by extruding thermoplastic polymeric material, as a molten thin-film for bonding a solid thin-film polymeric material to a single activated corrosion-protected surface of rigid flat-rolled sheet metal continuous-strip at-a-time.

Those production efficiency concepts for work-product are further augmented by efficient inventory management, enabling polymeric materials to be stored, independently, in a solid form for work-product production; so as to facilitate completing orders for specific market uses; thereby replacing conventionally-required storage and protection of multiple coils, or sheet packs, while awaiting shipment orders for polymeric-coated product.

Figure 1:
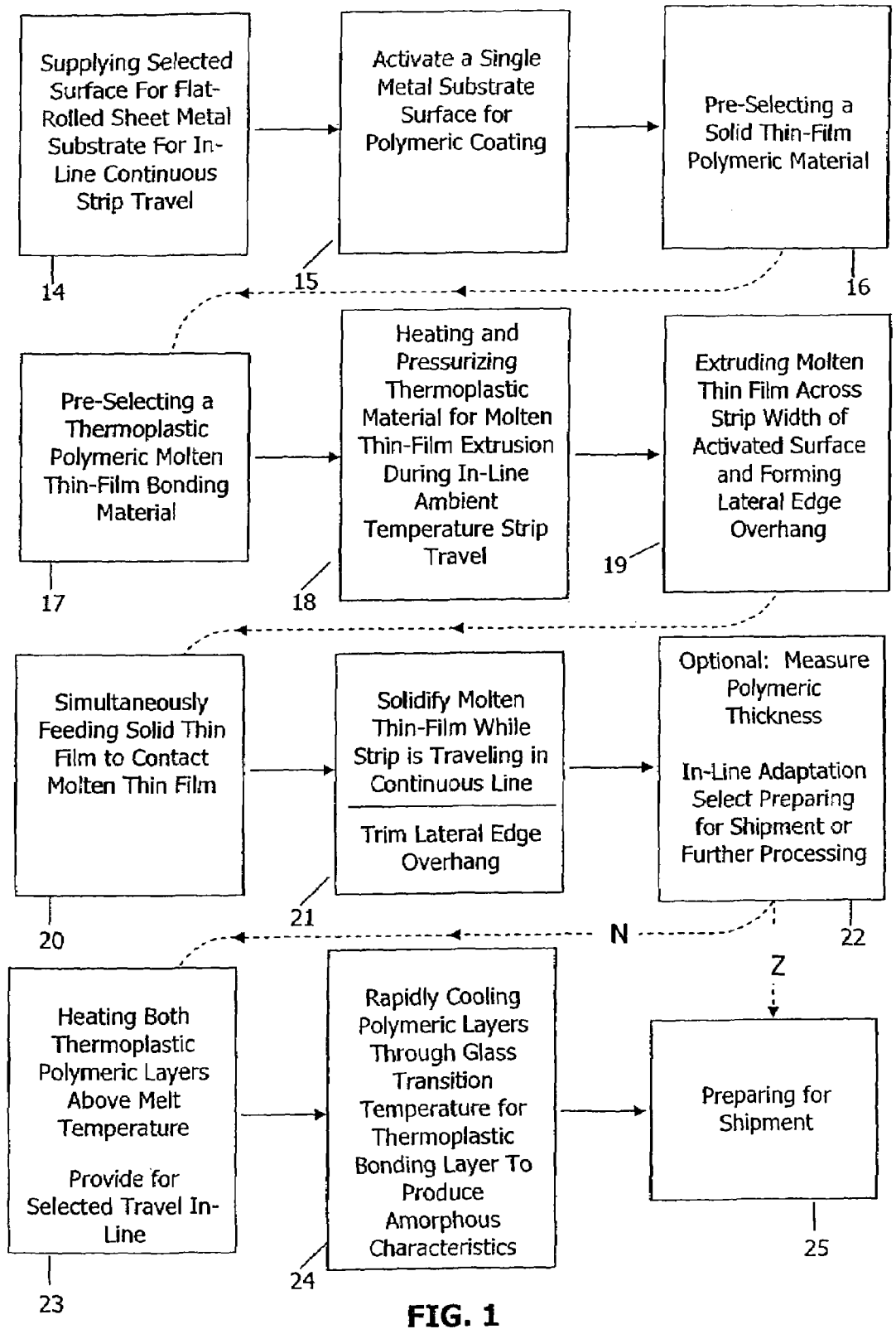
FIG. 1 is a diagrammatic flow-chart for describing processing steps of the invention for extruding pre-selected thermoplastic polymeric material as a molten thin-film for bonding a pre-selected solid thin-film polymeric material with a single activated surface of corrosion-protected elongated rigid flat-rolled sheet metal substrate during in-line travel; while providing selective direct shipment or alternate in-line finish-processing.

In carrying out the first embodiment of FIG. 1, the corrosion-protected rigid flat-rolled sheet metal as supplied at station 14 is selected from
(i) inorganic non-ferrous metallic coated low-carbon steel,
(ii) conversion-coated flat-rolled aluminum, and
(iii) conversion-coated flat-rolled aluminum/magnesium alloy.

Continuous-strip substrate travels in-line, in the direction of its length, presenting opposed substantially-planar corrosion-protected surfaces between its lengthwise-extending lateral edges. Corrosion-protection is selected so as to be capable of surface-activation for enhancement of polymeric coating-adhesion; said composite-coating provides protection in the event of accidental abrasion subsequent to a polymeric coating surface.

In-line surface-activation steps, as taught herein, eliminate surface particulate, and debris with light surface oils from associated sheet metal surfaces. Corrosion-protection for the sheet-metal substrate is selected to be capable of surface-activation for enhancement of polymeric coating adhesion.

In FIG. 1, a single-planar surface of the corrosion-protected substrate is activated at Station 15 for enhanced polymeric adhesion. Open-flame impingement burns off light-surface oils, surface-particulate, and surface debris, if any. The chemical content of the impinging flame is controlled so as to produce an oxidizing reaction of said surface causing loss of surface electrons; so as to enhance chemical bonding between an inorganic-metallic surface and a selected organic molten-film polymeric material.

Also, ionizing the gaseous atmosphere contiguous to the substrate surface, for example, by use of corona-discharge, provides and maintains surface-activation, loss of electrons during in-line substrate travel. Combining those pre-polymeric coating surface-activation steps augments adhesion by augmenting chemical bonding of an organic polymeric molten thin-film with an inorganic surface, during continuous in-line operations. A solid thin-film polymeric material is pre-selected at Station 16 of FIG. 1.

A thermoplastic polymeric material for molten thin-film extrusion is pre-selected at Station 17 of FIG. 1. Qualifications for that molten organic polymeric film include adhesive characteristics for bonding with an activated inorganic corrosion-protected substrate surface, while being presented free of a heating requirement; that is, said substrate surface is presented for polymeric coating essentially at ambient temperature. The molten thin-film is extruded in width-wise relationship to the elongated substrate; and, presents a pair of opposed substantially-planar molten surfaces. One surface of the molten-film bonds with the activated corrosion-protected substrate surface. The solid-film polymeric material is directed, as shown in later FIGS, to bond with the remaining of said pair of molten surfaces of the extruded film. In-line travel rates of the substrate and the solid-film are correlated; and, the molten thin-film extrusion is coordinated so as to facilitate mutual-bonding functions with the substrate-surface and with the solid film. Processing steps, materials and temperatures are selected to carry out concepts for enabling production of durable corrosion-protection for both substrate surfaces; which comprises part of a composite coating on a single-surface, in the polymeric coated embodiment of FIG. 1.

Maleic-anhydride modified polypropylene is an example of a selected molten thermoplastic polymeric thin-film with desired adhesive characteristics. These pre-selected polymeric materials for molten extrusion are supplied as solid pellets, melted, heated to desired temperature for extrusion, and pressurized at Station 18 of FIG. 1. The polymeric material extruded as molten thin-film is also pre-selected provide desired green-strength adhesive characteristics for a solid-polymeric film, free of a heating requirement for the substrate surface.

That is, the sheet-metal substrate is traveling with its activated surface essentially at ambient temperature in Station 18 of FIG. 1. The heated and pressurized thermoplastic material is extruded as a molten thin-film at Station 19. Extrusion die structure is selected to present an outlet-configuration forming an elongated thin-film extending width-wise, across the activated surface activated for deposition; and, purposefully, is extended further so as to form a polymeric overhang along each lateral edge of the elongated substrate. Extruding a polymeric overhang at each lateral edge, contributes with edge-trimming as described later, to achieving uniform polymeric coating thickness across the full width of the elongated substrate.

Referring to Station 20 of FIG. 1, substantially-simultaneously with contact of one-surface of the molten thermoplastic polymeric thin-film with the activated corrosion-protected surface of the traveling strip, the pre-selected solid thin-film polymeric material is directed for co-extensive contact with the remaining surface of the molten film. Due to above-described surface activation and pre-selected characteristics of both films, the molten polymeric thin-film and the polymeric solid-film establish "multiple-polymeric layers", with overhang, traveling in-line associated with the single activated substrate surface.

The surface activation and polymeric adhesive characteristics of the molten film contribute to the capability to use of ambient temperature sheet-metal substrate; and, use of ambient temperature substrate contributes substantial heat removal from the molten thin-film, which is directed toward the sheet-metal strip. The ability to use ambient-temperature substrate enables extrusion, at a temperature significantly above melt-temperature for the selected polymeric material, which facilitates thin-film extrusion. Simultaneously directing solid film at Station 20, to contact the remaining molten surface of the thin-film, also helps to remove heat, from the molten thin-film which removal is directed toward the solid-film during in-line travel; and that heat removal is augmented by in-line temperature-modulating surface means, as described in relation to later apparatus figures. The coated multiple-polymeric layers, along with each lateral-edge overhang are solidified at Station 21; and, subsequent to solidification, the elongated substrate is directed for trimming of the polymeric overhang extending beyond each lateral edge; which is carried out at Station 21 as part of continuous-line operations.

The thickness of the multiple-polymeric-layers on the activated surface of the substrate can be measured on-line at Station 22 by utilizing penetrative electromagnetic-radiation; for example, by locating infra-red thickness gauge means for thickness measurements across strip width. A major portion of the combined polymeric layers results from uniform-thickness solid polymeric film; that thickness, as provided by a reliable solid-film manufacturer, can be readily verified prior to use. A thickness measurement, at selected locations across strip width, can therefore help to uncover and locate blockage, if any, in the elongated-die outlet for extruding the molten thin-film. The advantage is that any such blockage location would be promptly identified, for prompt correction and tagging of work product.

In the single-surface multiple polymeric-layer coating embodiment of FIG. 1, an in-line adaptation at Station 22 provides for selectively directing the work-product in-line, free of finish-processing, and preparing the work-product for direct shipment. The alternative at Station 22 guides the work product for finish-processing, which largely enhances the multiple layer polymeric coating properties and adhesion.

Selecting further processing at Station 22, directs the strip in-line for re-heating at Station 23. Selecting finish-processing can be at least partially responsive to market-use and market-demand requirements. Market demand in some industries can be met by relying on the composite corrosion-protection, on both surfaces, while minimizing processing steps of the single-surface-multiple-polymeric-layers at Station 22 of FIG. 1. However, the finish-processing alternative can also be carried out, as part of the same continuous-line polymeric-coating operation, to enhance polymeric properties.

Referring to Station 23 of FIG. 1, finish-processing procedures are initiated by heating multiple-thermoplastic-polymeric-layer coated strip to establish desired melt characteristics throughout the combined layers. That heated condition is sustained for a selected interval of in-line travel, which augments polymeric adhesion by implementing more thorough polymeric contact with the single-activated surface. That is, certain corrosion-protected surfaces can present an irregular topography; and, the strength of the adhesion with the substrate can be implemented by remelting so as to augment contact coverage of that surface. Also, the re-melting enhances bonding of the polymeric materials of solid-film layer with the thin-film molten tie-layer for that solid-film.

In addition to augmenting adhesion of the molten thin-film with the substrate surface, part of the pre-selection of the polymeric materials for the multiple-polymeric layers, involves adhesive characteristics between those selected multiple-polymeric layers on a single surface. Those adhesive characteristics are augmented by reheating of both polymeric materials and selected in-line travel, as heated, during the finish-processing at Station 23. Fabricating opportunities and fabricating capabilities are increased by said finish-processing.

At Station 24 of FIG. 1, subsequent to the above melting and selected interval of travel with melt characteristics, as part of the finish-processing, the multiple-polymeric-layers are rapidly cooled through respective glass-transition temperatures. That rapid cooling establishes amorphous characteristics throughout the thermoplastic polymeric materials of the combined layers; which augments fabrication capabilities for market-usage products, and, can enhance surface properties of the solid-film polymeric material, including a smoother appearance.

Station 25 provides for preparing the work product from Station 22, for direct transfer or use; and, also, to provide for preparing finish-processed product, from Station 24 of FIG. 1, for transfer or use. Handling product for both alternatives is provided at Station 25; that is, by recoiling or by forming of bundles of sheets sheared to desired size.

Figure 2:
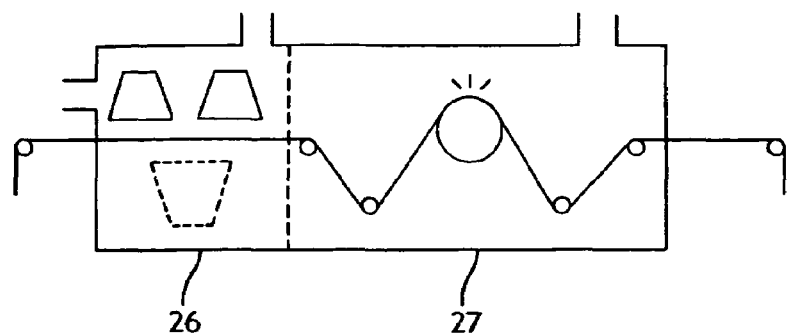
FIG. 2 is an expanded schematic cross-sectional view for describing methods and apparatus of the invention for activating an inorganic corrosion-protected surface of elongated rigid flat-rolled sheet metal for polymeric adhesion.

The FIG. 2 expanded cross-sectional view of the apparatus is in a vertical plane, which is perpendicular to the planar flat-rolled metal substrate surface, and which extends in parallel relationship with the elongated axis of strip travel. Section 26 of FIG. 2 includes rows of burners impinging open-flame on a surface to be activated; the content of the flame is controlled to produce an oxidizing reaction causing loss of electrons on that surface. The rows of burners located within Section 26 extend across strip width; and, the number of burner rows is selected dependent on line speed and condition of the strip surface. In the embodiment of FIG. 1, solely a single-surface is activated for polymeric coating; those burner rows are shown in solid-lines in Section 26 of FIG. 2; and, act on the upper surface of the substrate to provide such surface-activating oxidizing reaction which contributes to enhancing in-line polymeric coating adhesion on that surface.

However, as shown in FIG. 2, the invention provides an opportunity, while carrying-out the single-surface polymeric coating embodiment, to use a nominal flame treatment on the remaining opposite-surface. That nominal flame treatment is mainly concerned with remaining debris; and, is represented by a single burner shown in interrupted lines, acting on the remaining surface which is opposite to the surface being activated for polymeric multiple-layer coating.

Figure 4:
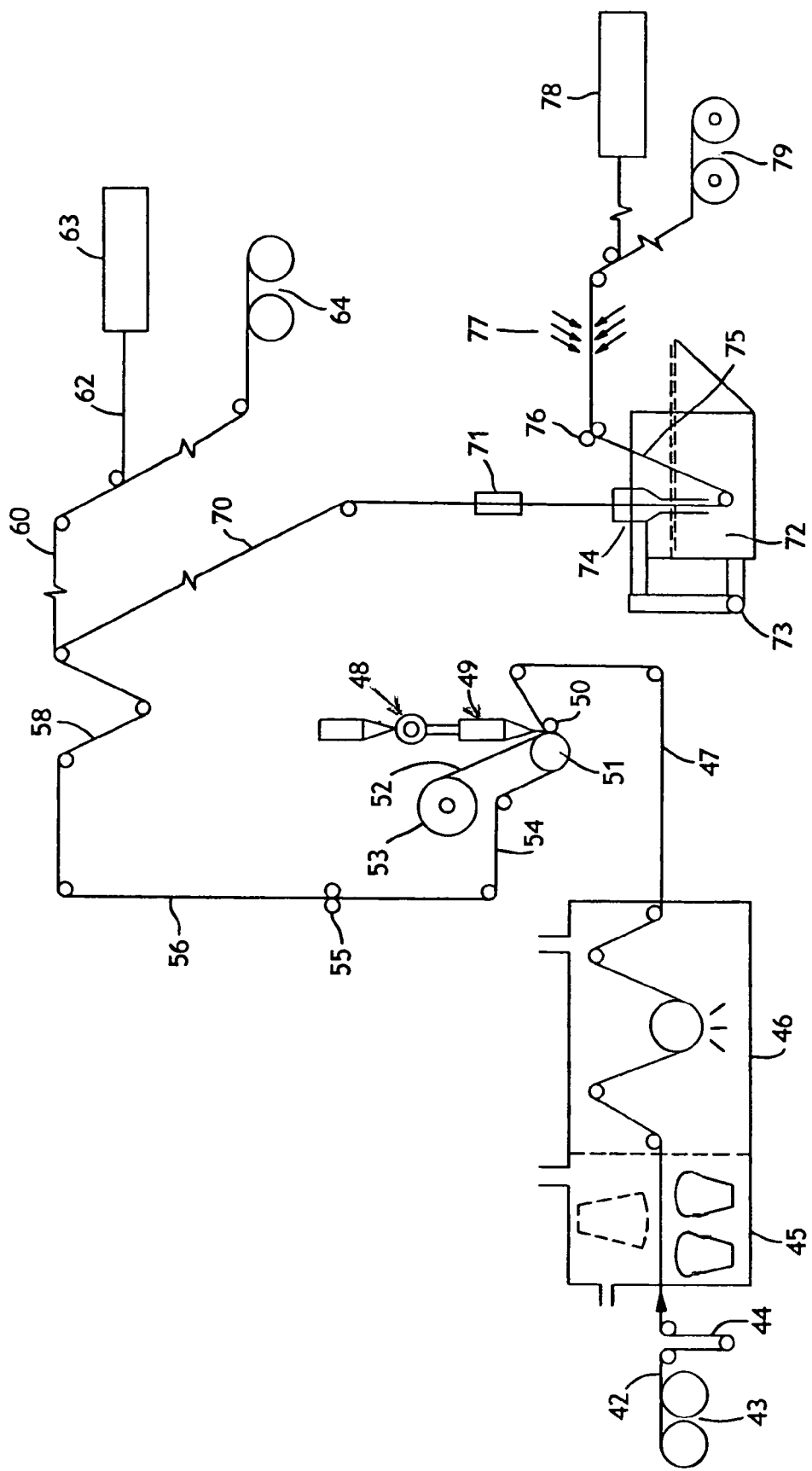
FIG. 4 is a schematic general-arrangement view for describing continuous-line apparatus of the invention utilizing single-surface activation, of dual-surface corrosion-protected strip, for multiple-polymeric-layer coating, for carrying-out processing, with selective steps, of FIG. 1.

That nominal-flame treatment feature of the apparatus of FIG. 2 provides for burn-off removal of previously-used light surface oils, particulate, and/or associated debris, from that remaining corrosion-protected surface; which is to remain free of multiple-polymeric-layer coating, in the single-surface embodiment of FIGS. 1 and 4. That removal of surface oils and/or associated debris from the remaining corrosion-protected surface helps to avoid subsequent surface contamination; for example, when a single-surface polymeric coated product of the invention is prepared for transfer or use. That nominal-flame cleansing step, of the remaining surface can help to protect the multiple polymeric-layers, on the single activated surface, during a coiling or stacking of sheared sheets; and, also, as taught herein, can substantially eliminate future requirements for use of protective coating oils when coiling or stacking sheared-product of the polymeric embodiment described in relation to FIGS. 1 and 4.

Further, as part of achieving or maintaining single-surface activation, the number of corona-discharge conductors can be selected, as indicated by the three corona-discharge rows within Section 27 of FIG. 2. Corona discharge ionizes gas contiguous to the substrate surface causing and/or implementing surface activation across full-surface width of the single surface to be polymeric coated; while remaining free of electrical-sparking by properly selecting electrical energy level. The gas ionizing means and energy level are selected based on strip width and can take into consideration the line-speed for continuous-line operations of the invention.

Several thermoplastic polymeric material categories for molten extrusion can be referred to broadly, as:
  (i) an anhydride-modified thermoplastic polyolefin adhesive resin, (ii) an anhydride-modified thermoplastic polyacrylate resin, and (iii) acid modified, such as by an anhydride, terpolymer.

Objectives in selecting from those categories involve capability for thin-film extrusion of a molten tie-layer which will provide sufficient green-strength adherence for both the molten and the solid polymeric layers for in-line travel with the activated substrate surface. Also, of added concern is providing that coating adhesion on a substrate surface which is free of a heating requirement: that is, capable of being achieved with the substrate at ambient temperature.

Specific molten-film examples include: anhydride-modified ethylene vinyl acetate (EVA) and maleic anhydride-modified polypropylene (PP). Further specific polymeric material examples, for molten thin-film extrusion, and for solid-film of the multiple polymeric-layers, are tabulated later in this disclosure. Extruded polymeric materials are selected which exhibit desired molten adhesion characteristics with an activated corrosion-protected continuous-strip surface and, also, for molten adhesion characteristics with pre-selected thermoplastic polymeric coating materials of a solid-film. Desired adhesion characteristics provide polymeric green strength adhesion for combined travel, in-line, of such multiple-layers, associated with a single-activated surface of the rigid flat-rolled sheet metal substrate, during continuous-line operations; the ambient temperature for the substrate can vary from about seventy-five degrees Fahrenheit to about one hundred and fifty degrees Fahrenheit.

Figure 3:
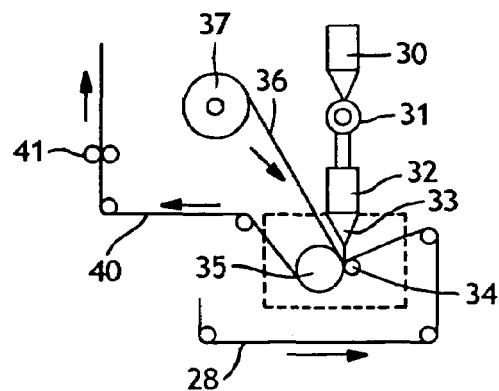
FIG. 3 is a schematic cross-sectional partial view for describing single-surface multiple-polymeric-layer coating apparatus of the invention.

Referring to FIG. 3, substrate 28, presenting a single-activated surface, is traveling in-line in the direction indicated; that single-activated surface is directed into an area defined for polymeric coating. Polymeric materials for a molten thin-film are pre-selected such that substrate 28 can be presented, free of a heating requirement for purposes of polymeric coating adhesion. Providing that capability decreases and can substantially eliminate complications for continuous-line extruded polymeric coating operations; and, also, can augment efficiency by enabling increased line speeds for continuous-line operations; it should be noted that being free of a strip heating requirements decreases heat removal requirements for molten film solidification.

A single-surface of strip 28, as activated with apparatus as described in relation to FIG. 2, travels for polymeric coating upon entering a defined coating location shown in FIG. 3. The molten-film material, having described adhesive properties, is supplied to hopper 30, preferably, as solid pellets. Hopper 30 feeds into extrusion preparation structure 31 for heating and melting; and, the pressure of the molten material is elevated by internal auger means not shown. The resultant molten and pressurized thermoplastic is heated above its melt temperature and transferred through heated-block structure 32, into die structure 33; which presents a width-wise-oriented elongated opening for extruding the molten thin-film.

The elongated opening of die structure 33 delivers a molten thin-film into a coating-nip which is defined between roll 34 and temperature-modulating roll 35 of FIG. 3. That coating nip provides for width-wise disposition of substrate 28, presenting its single activated surface for receiving the vertically-downwardly-directed molten thin-film from polymeric die structure means 33, for contact with the single activated surface of rigid sheet-metal substrate 28. The solid film 36 from film coil 37 (FIG. 3) is directed into that defined coating nip.

Figure 3A:
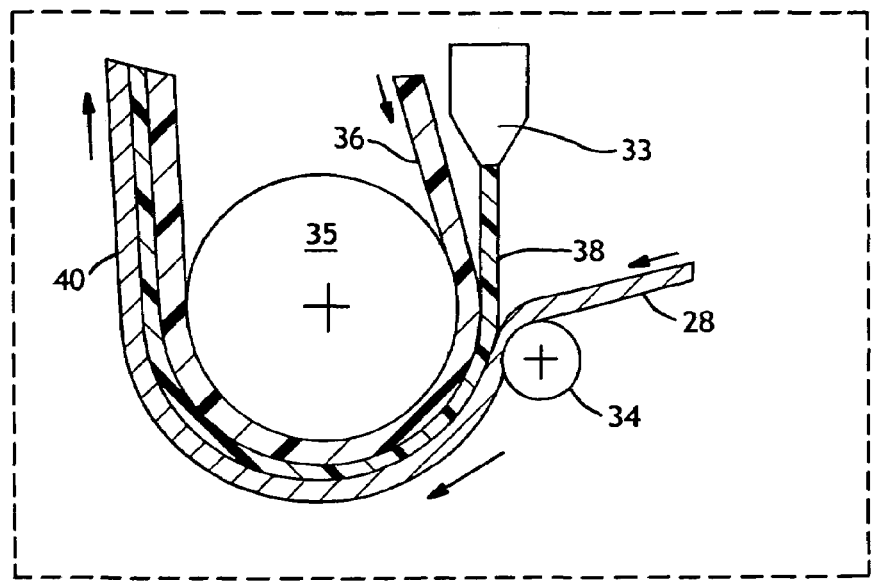
FIG. 3A is an expanded cross-sectional view, of a designated portion of FIG. 3, for describing principles of the invention for molten polymeric film bonding of a solid polymeric film to a single surface of elongated rigid flat-rolled sheet metal substrate, during continuous-strip coating operations.

Referring to the expanded view of FIG. 3A, substrate 28, presents its single activated surface for contact with molten-film 38, as extruded from die-structure means 33. Film 38 presents a pair of opposed substantially-planar molten surfaces as extruded substantially-vertically-downwardly into the defined coating-nip; one planar surface of film 38 contacts said activated surface as strip 28 travels into the coating-nip defined between roll 34 and temperature-modulating roll 35.

Solid polymeric film 36, from solid-film coil 37 (FIG. 3), is directed along the periphery of roll 35 for substantially-simultaneous contact, within the coating-nip, with the remaining molten-surface of film 38. The in-line rates of travel of strip 28 and solid-film 36 are correlated; and, feed of molten thin-film 38 is quantitatively coordinated to enable achieving desired adhesion during passage through the nip between roll 34 and temperature-modulating roll 35. Molten film 38 is solidified during selected travel circumferentially about the periphery of temperature-modulated roll 35.

In a preferred embodiment, roll 34 comprises a Teflon®-coated neoprene roll; and, exerts a nominal pressure against the polymer-free surface of strip 28; that pressure by roll 34 augments adhesive contact of the remaining surface of strip 28, with a single molten surface of the thin-film extrusion 38. Roll 34 also urges contact of the remaining molten surface of thin-film 38 with solid-film 36 as the molten-film 38 and solid-film 36 are directed for substantially-simultaneous contact within the defined coating nip.

Temperature-modulating roll 35 presents a peripheral surface which is cooled internally, by coolant circulation, for purposes of implementing heat-removal from molten film 38 during combined travel of the combined films and substrate 28 peripherally of roll 35. One surface of solid film 36 contacts the temperature-controlled peripheral surface of roll 35 while molten thin-film 38 bonds with the remaining surface of solid-film 36. Molten film 38 is in contact with ambient temperature strip 28, which facilitates removal of heat from the molten-film in the direction of, and into, the ambient-temperature corrosion-protected flat-rolled sheet metal substrate 28.

In order to enable travel at line-speeds which can exceed about five hundred feet per minute (fpm), heat removal for desired solidification of molten film 38, as taught herein, is implemented by cooling the peripheral surface of temperature-modulating roll 35 for said combined travel of the multiple-polymeric-layer-coated substrate. The size of roll 35 and internal cooling of roll 35 are selected to maintain the contacted periphery, of temperature-modulated roll 35, at a temperature significantly below melt temperature for the extruded thin-film 38 so as to achieve required heat removal for bonded solidification of the multiple-polymeric-layers of coated strip 40. For example, the periphery of temperature-modulation roll 35 can be maintained at a temperature in the range of about fifty degrees Fahrenheit to less than about one hundred seventy five degrees Fahrenheit.

The apparatus of FIG. 3A is operated to deliver film 38 at a sufficient temperature for molten thin-film extrusion; also providing for green strength polymeric adhesion, at selected line-speeds, for both films 36 and 38 traveling with the substrate. A temperature level for molten-film 38 is preferably selected higher than melt temperature for a thermoplastic polymeric material so as to facilitate desired thin-film extrusion characteristics. The arrangement, and operation of, the apparatus shown enables use of molten thin-film extrusion at a temperature which can be selected in a range of above four hundred to about six hundred degrees Fahrenheit (about 205° C. to about 315° C.). Operation of the apparatus of FIG. 3A provides for solidification of the molten polymeric film during travel about the periphery of roll 35 at the selected line speed.

For that capability, the circumferential peripheral area of temperature modulated-roll 35 and its internal cooling are selected to cause the extruded polymeric layers to solidify satisfactorily during in-line travel associated with the periphery of temperature-modulating roll 35. Cooling of extruded polymeric film 38 is initiated, as referred to above, by direct contact with ambient-temperature strip 28; and, also by its contact with solid-film 36 which is in contact with the internally-cooled periphery of temperature-modulating roll 35. That arrangement provides desired adhesion of polymeric-film 38 with the activated surface of strip 28 and for solid polymeric film 36; which combine to establish multiple-polymeric layers associated with the activated-surface of strip 28. The resulting solidified multiple-polymeric-layer coated strip 40 travels circumferentially-tangentially from roll 35, in the direction indicated in FIGS. 3 and 3A. The thickness of the solid film remains substantially uniform during travel peripherally of roll 35, while the molten film can be thinned prior to full solidification during that travel.

Polymeric solidification enables edge trimming of polymeric overhang from each lateral edge, of the single-surface coated strip 40, by edge-trimming means 41 in FIG. 3. The concept of forming polymeric overhang at each lateral edge, solidifying, and removing that overhang contributes to solving a problem, as recognizing with achieving uniformity of coating. Extruding molten thin-film polymeric coating across flat-rolled strip width, to terminate at each lateral edge, caused edge build-up; that is: thickening, along each such strip lateral edge. To eliminate that non-uniform edge build-up problem, and its associated disadvantages, the thin-film extrusion die, such as 38 of FIG. 3A, is extended across full strip width and, in addition, is extended beyond each lateral edge of the strip. The width of the solid-film 36 (FIGS. 3, 3A) is selected to be coextensive with the extruded molten thin-film; both films combine so as to establish a polymeric overhang beyond each lateral edge of the strip. After in-line solidification, as described above, that polymeric overhang, including any edge thickened portion, is removed from each lateral edge at edge-trim station 41 of FIG. 3.

In the schematic general arrangement view of continuous-line single-surface polymeric coating apparatus shown in FIG. 4, corrosion-protected rigid flat-rolled sheet metal substrate 42 is supplied from uncoiling station 43; and, looping-pit 44 is utilized so as to enable continuing in-line travel of strip, when changing strip-supply coils. The substrate is directed for activation of a single-surface of strip 44. That surface confronts rows of open-flame impingement burners, as shown in solid-lines in station 45; and, is activated by oxidizing reaction on that surface.

In the single-surface coating embodiment of FIG. 4, a single burner, as shown by interrupted lines in station 45, can be provided for removal of surface oils and associated debris, if any, from that opposite surface of substrate 42; that step helps to prevent later surface contamination when coiling work-product of the single-surface polymeric-coated embodiment of the invention.

Activation of a single-surface for polymeric coating can be maintained, and/or augmented, in-line at corona-discharge section 46; corona discharge ionizes gas contiguous to the surface so as to activate that surface. Strip 47 is guided in-line so as to present that single activated surface for polymeric coating utilizing apparatus as described in relation to FIGS. 3 and 3A. That is, the substrate 47, presenting a single activated surface, is directed for polymeric coating solely on that activated surface.

In preparation for molten polymeric extrusion, pelletized solid thermoplastic polymeric material, pre-selected for the above-described adhesion characteristics, is supplied, heated and pressurized in molten polymer preparation apparatus, generally-designated at 48, in FIG. 4; that apparatus includes the units described in relation to FIGS. 3 and 3A. Substrate 47 is directed, free of a heating requirement for polymeric coating purposes, present its single activated surface for receiving polymeric material. The thermoplastic polymeric material selected for molten extrusion is preferably heated above its melt temperature for purposes of, thin-film extrusion width-wise of strip 47 and beyond lateral edges of the strip, by an elongated, width-wise oriented, thin-film die opening forming part of die structure 49. As extruded, the thin-film presents a pair of substantially-planar opposed molten surfaces.

Elongated substrate 47 is directed for width-wise oriented travel toward and partially around roll 50 into the coating nip defined between roll 50 and temperature-modulating roll 51. Width-wise oriented polymeric thin-film, from die structure 49, contacts the activated surface of the substrate entering the width-wise-oriented coating-nip defined by coaction between roll 50 and temperature-modulating roll 51. Molten thin-film is extruded from the elongated width-wise extended opening of die structure 49 into that coating-nip in a manner previously described in relation to FIGS. 3 and 3A.

One surface of the pair of substantially-planar opposed molten surfaces of the extruded thin-film contacts the single pre-treated surface of strip 47 and, substantially-simultaneously, the remaining planar surface of the molten-film contacts one surface of the width-wise co-extensive solid thin-film 52; being fed from solid-film coil 53 upon entering the defined coating nip, as shown and described in relation to FIG. 3A. The remaining surface of solid-film 52 contacts temperature-modulating roll 51; and, moves in combination with the molten film, initially under nominal pressure from roll 50, which also urges contact of solid-film with temperature modulation roll 51.

The in-line travel rate of solid film 52 and the in-line travel rate of the elongated sheet metal substrate 47 are correlated; also, the pressurized feed of the extruded molten thin-film, from the elongated opening of die structure 49, is quantitatively coordinated to accomplish desired adhesion of the solid-film; and, to maintain green-strength for travel of both films with the strip. Those multiple-polymeric layers travel on the activated surface of substrate 47 for removal of heat and solidification of the molten film.

The peripheral surface of temperature-modulating roll 51 is maintained at a selected operational temperature by removing heat internally from that roll. That periphery is cooled by circulating a coolant fluid within of temperature-modulating roll 51. Significant heat is also transferred from the molten thin-film in the direction of ambient-temperature strip 47. Any remaining necessary heat removal for solidification of the molten thin-film is augmented by said travel around the peripheral surface of internally-cooled temperature-modulating roll 51. Internal cooling, and the diameter of roll 51 are selected so as to enable strip travel, at line speeds substantially in excess of five hundred feet per minute (fpm), while accomplishing desired solidification of the multiple-polymeric-layers for in-line travel upon departure of substrate 54 from the peripheral surface roll 51.

Substrate 54 with solidified multiple-polymeric layers travels in-line, tangentially from the periphery of temperature-modulating roll 51, toward edge-trim unit 55 for removal of solidified polymeric overhang contiguous to each lateral edge of the strip. As previously described, forming lateral-edge overhang, and trimming lateral edge overhang, contribute to achieving and augmenting production of a substantially-uniform polymeric coating thickness across strip width of substrate 56.

An in-line adaptation, disclosed earlier in relation to FIG. 1, enables single-surface polymeric coated substrate 56 to be prepared for direct shipment or transfer for direct market-product usage. That provision, for direct handling of corrosion-protected flat-rolled sheet-metal substrate, with a single-surface as initially polymeric coated, enables production efficiencies; and, increased production of manufactured work-product qualifying for market-uses discussed later herein.

The single-surface coated strip 56 is directed through looping-unit 58 which accumulates strip to provide for modifications in strip travel for enabling preparation for shipment by recoiling or other transfer means. Single-surface polymeric coated strip 56, with its remaining surface free of debris, can then be directed along path 60 to travel path 62 which utilizes a flying shear (not shown) for preparing sheared sheet metal stacks for transfer. Another option is directing the single-surface polymeric coated strip to recoiling station 64 for shipment, or for use as coiled product.

An alternate handling-adaptation of the continuous line of FIG. 4, enables single-surface multiple-polymeric-layer-coated strip 56 to be directed from looping pit 58, along travel path 70, toward finish-processing procedures for enhancing properties of the single polymeric coated surface embodiment. The first of those procedures involves heating to establish melt-temperature characteristics throughout the multiple-layer polymeric coating. Heating unit 71 can include high-frequency induction heating means, which concentrates heat at surfaces of low-carbon steel; and, can be used at selected frequencies for heating aluminum or aluminum/magnesium alloy substrate, for confronting the single-surface polymeric coating.

As taught herein, infra-red heating means within heating unit 71 directs heat for the multiple-layer polymeric coating inwardly from the external surface toward the sheet metal substrate. A combination of those two heating sources can help to prevent overheating of the sheet-metal substrate, which can help to avoid change in characteristics, for example, an electrolytic tin plated corrosion-protective coating on both flat-rolled sheet metal substrate surfaces; and, can also help to avoid undesirable delays in the cooling rate of sheet metal substrate when heating is carried out solely by high frequency induction. In brief, heating of substrate and the polymeric coating can be selectively carried-out to avoid coating and cooling complications in continuous-line operations.

During finish-processing the single-surface polymeric-coated substrate is permitted to travel a short interval with the polymeric-layers in the selectively-heated condition achieved in unit 71. That provides an opportunity, before actively initiating cooling, to enhance bonding of the multiple-polymeric layers; and, also, increase surface of coverage corrosion-protected topography, on the single polymeric-coted surface, which can present an irregular surface.

The single-surface polymeric-coated substrate travels from heating means 71 toward rapid cooling which is implemented by cooling-liquid from quench bath 72. The multiple-polymeric layers are rapidly-cooled through glass-transition temperature so as to produce amorphous characteristics throughout the single-surface coated polymeric-layers. Such amorphous characteristics can facilitate, and add to, fabricating capabilities for market-product uses.

The cooling solution for quench bath 72 can be deionized water or tap water. Temperature-control and circulation measures for the cooling solution can facilitate rapid-cooling for obtaining desired amorphous characteristics; those measures can also take into account line-speed, sheet metal thickness and other sheet metal dimensions. Circulating cooling solution out of quench bath 72, using pump 73, can be used to augment control of temperature for rapid-cooling capabilities. Cooling of recirculating solution can be implemented with a closed-system heat exchanger, as shown in a later FIG, for removing heat from the quench liquid of bath 72; or, from that liquid as being pumped for return to bath 72.

Cooled solution is returned by entry structure 74. The configuration of return entry structure 74 contributes to laminar flow of the cooled quench liquid, against surfaces of the coated strip, so as to augment uniform rapid-cooling to desired temperature throughout polymeric coating and the substrate; that is, as taught herein, the metal substrate of the single-surface polymeric-layer coated strip is cooled sufficiently to avoid any detrimental delay in rapid cooling of the polymeric layers through glass-transition temperature; and, also, to help remove residual heat of the metal strip, so as to avoid a subsequent temperature rise, on-line, notwithstanding temporary cooling of the polymeric materials through glass transition temperature.

Strip 75, with its single-surface multiple-polymeric layers cooled through glass transition temperature, travels through wringer-roll unit 76 for surface-removal, and return, of quench liquid to bath 72. Drying of the coated strip 75 is carried out by blow dryer means 77. Dried, finish-processed, single-surface multiple-polymer layer coated, corrosion-protected sheet-metal substrate is then directed for transfer preparation; for example: by preparing stacks of sheared sheets at 78, or for recoiled shipment at station 79.

Figure 5:
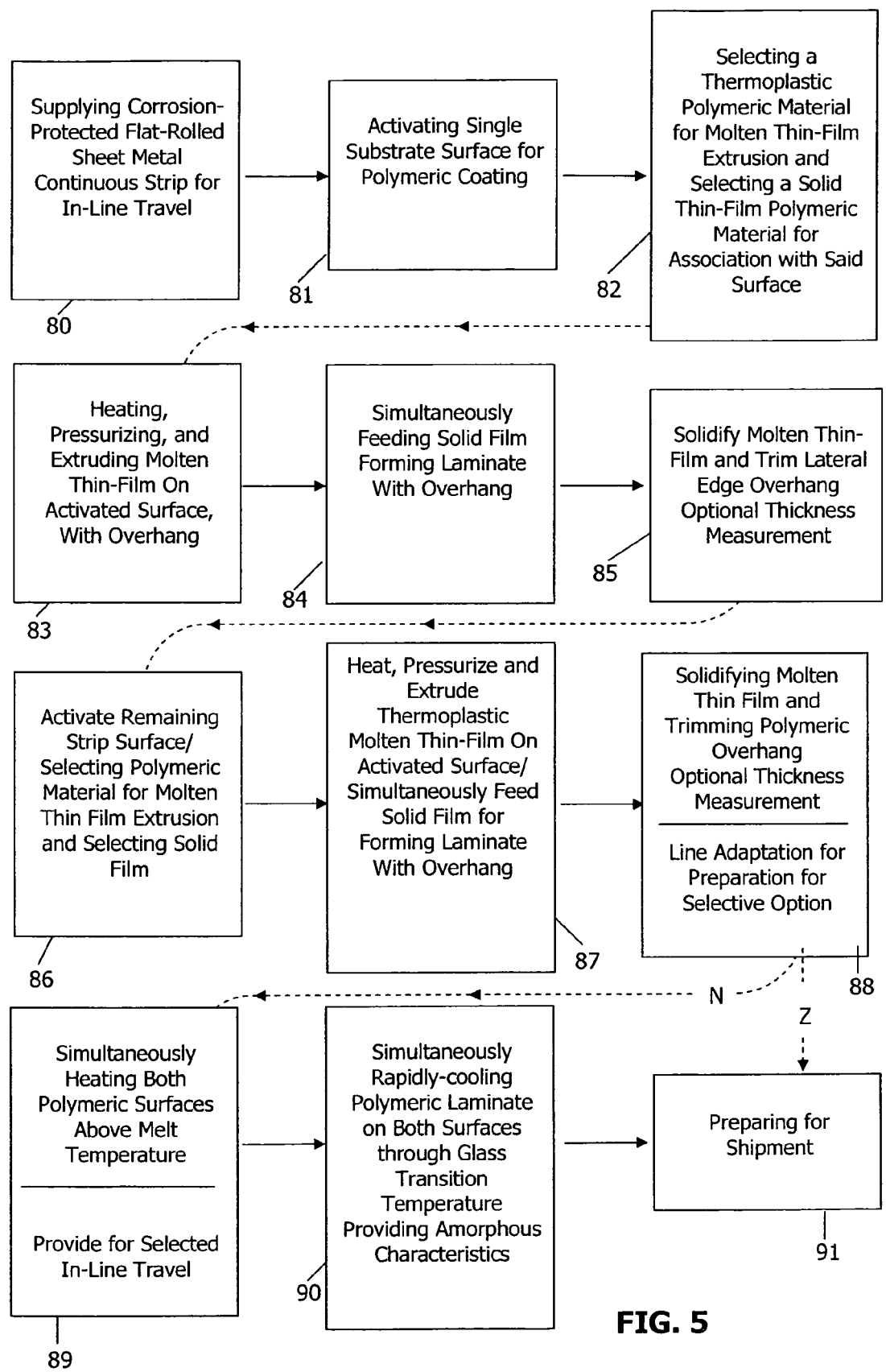
FIG. 5 is a diagrammatic flow-chart for describing continuous-line processing steps of the invention for activating a single-surface of corrosion-protected sheet metal for bonding of a molten polymeric film and a solid polymeric film, with separate and consecutive single-surface activation and coating of the remaining corrosion-protected rigid flat-rolled sheet metal continuous-strip surface, including selective preparation for direct-shipment or added finish-processing prior to being directed for transfer or use.

Continuous-line operations for the dual-surface multiple-polymeric-layer coating embodiment of the invention are presented in flow-chart FIG. 5. Corrosion-protected rigid flat-rolled sheet metal continuous-strip is supplied at Station 80 for in-line travel; and, is directed to Station 81 for activating a single surface for polymeric-coating by: control of flame-impingement oxidizing of that surface causing loss of electrons, by ionizing gas contiguous to that surface for the same purpose, and/or by a combination of those surface-activation steps, as described earlier; carried-out on a single-surface at a time, in preparation for polymeric coating of that surface.

Pre-selecting of the multiple-polymeric materials is initiated at Station 82 of FIG. 5 for coating the single surface, activated at Station 81. Thermoplastic polymeric material capable of molten thin-film extrusion, having adhesive characteristics capable of bonding with the activated surface and, also, capable of bonding with a solid-film thermoplastic polymeric material as pre-selected at Station 82. Polymeric-coating of the multiple-polymeric layers is carried out, following activation of a single surface at a time, during line travel of the single activated flat-rolled sheet metal continuous-strip substrate.

Heating, melting, pressurizing, and extruding, of a thermoplastic polymeric material, having adhesive characteristics as molten thin-film, are carried out at Station 83. That polymeric material with adhesive characteristics is heated to a temperature above its melt-temperature to facilitate extruding thin-film presenting opposed substantially-planar molten-film surfaces; which extend width-wise across the single activated-surface. Said molten film is extruded further forming a polymeric overhang at each lateral edge of said strip. Polymeric materials for a molten thin-film layer, as disclosed later herein, are pre-selected to provide desired green-strength adhesive-characteristics for in-line travel with the activated substrate surface; and, also, to provide for in-line associated travel of a pre-selected solid film.

One molten surface of the thin-film with adhesive characteristics is presented for contact with the activated substrate surface. The pre-selected solid film is fed, at Station 84, for substantially-simultaneous contact with the remaining molten surface of the extruded film, so as to provide for associated in-line travel. The solid film is width-wise co-extensive in contact with the remaining molten surface of the extruded film, establishing multiple-polymeric-layers extending across strip width; and, forming an overhang at each lateral edge of the strip for travel with the activated surface of the strip.

Pre-selection of polymeric materials for both the molten-film and the solid-film which function together, as described herein, is significant; and, pre-selecting molten thin-film polymeric-materials which enable the strip to be fed at substantially ambient temperature has particular significance. Eliminating a heating requirement for the substrate helps to avoid heat-removal complications, which can diminish line-speeds for rigid sheet-metal polymeric coating operations. Also, an ambient temperature substrate facilitates solidifying of the molten film on-line, as indicated at Station 85 of FIG. 5, for trimming of the multiple polymeric-layer overhang which contributes to uniformity of polymeric coating thickness, as previously described.

Polymeric thickness on the multiple-polymeric-layers on the single-surface can be measured at Station 85 for verifying thickness of the previously molten polymeric layer having adhesive characteristics. Present teachings combine use of a solid-film within extruded molten-film for multiple-polymeric layer coating of flat-rolled sheet metal. Among the advantages of that combination is that the solid-polymeric film is provided at a substantially uniform thickness, which can be relied on; and/or, can be readily observed or verified off-line if otherwise. The major purpose for on-line thickness measurement is to detect a discrepancy, if any, in extruding the molten thin-film; such as: a blockage of a portion of an elongated polymeric extrusion die. Such a molten-film discrepancy can be readily detected by thickness measurement across strip width; and, can be promptly corrected on-line; such a detection could also include tagging of any product which could be lower than the expected standard for manufactured work-product of the invention.

In completing the dual-surface polymeric-coated embodiment of FIG. 5, the steps of (i) activating the remaining strip surface, (ii) providing pre-selected polymeric material for molten thin-film extrusion, and (iii) providing a pre-selected solid-film polymeric material, are carried-out at Station 86. The thermoplastic polymeric material for extrusion is heated, pressurized and extruded as a molten thin-film for deposition at Station 87; that deposition extends across strip width and includes forming a polymeric overhang at each lateral edge of the strip. Substantially-simultaneously with that deposition, the pre-selected solid-film thermoplastic polymeric material is directed width-wise coextensively with the molten film, establishing multiple-polymeric layers extending across strip width, and extending beyond lateral edges, for travel in-line with the activated substrate surface.

Heat removal from the molten film is initiated by contact with ambient temperature strip; solidifying the molten thin-film is completed in-line at Station 88 of FIG. 5; and, trimming overhang at each lateral edge is carried out to continue thickness-uniformity for the polymeric coating. That uniformity can be verified by in-line measurement of polymeric-coating thickness at Station 88. An in-line adaptation available at Station 88 enables selecting between preparing the dual-surface multiple-polymeric-layer coated strip work product for direct shipment and/or use free of finish processing. That adaptation augments production efficiency for certain end-market use products; while maintaining an ability to proceed, in-line, with finish-processing for supplying other market users.

Finish-processing steps can significantly improve polymeric coating and adhesion characteristics for the dual-surface multiple-polymeric layers; which can significantly enhance fabricating characteristics of the work product for particular market-product uses. An initial step, in that finish-processing of dual-surface multiple-polymeric layer coated strip, is heating the polymeric coating layers on each surface within a selected temperature range. That heating is carried out at Station 89 of FIG. 5; a temperature is selected to augment full-surface contact of the extruded polymeric tie-layer with what can be an irregular topography, presented by certain corrosion-protective coatings.

The temperature of that tie-layer and the solid thin-film layer are raised to exhibit melt characteristics; preferably, by combining high-frequency induction heating for the sheet-metal substrate, and the use of infra-red to implement uniform heating of the polymeric layers. That combination can help to avoid overheating of the sheet-metal substrate. An interval of in-line travel is provided before active cooling steps are initiated. That interval of in-line travel between heating and cooling augments adhesion with each respective metallic substrate surface; while also improving bonding of the polymeric film materials within the multiple-polymeric layers on each surface.

Rapid-cooling of the polymeric layers on each surface through glass-transition temperature for polymeric layers can be carried out simultaneously at Station 90 of FIG. 5; which has the advantages of efficiency and uniformity; such rapid cooling treatment, following melt conditions, produces uniform amorphous characteristics throughout the multiple-polymer-layers on both surfaces. Preparing the finish-processed dual surface multiple-polymeric layer coated strip for shipment is carried-out at Station 91; such preparation can include recoiling of the dual-surface polymeric coated work product; or, in-line shearing-to-length for transfer of sheet stacks. Station 91, also provides for preparing for shipment dual-surface polymeric coated strip, without finish processing, as delivered from Station 88 of FIG. 5.

Figure 6:
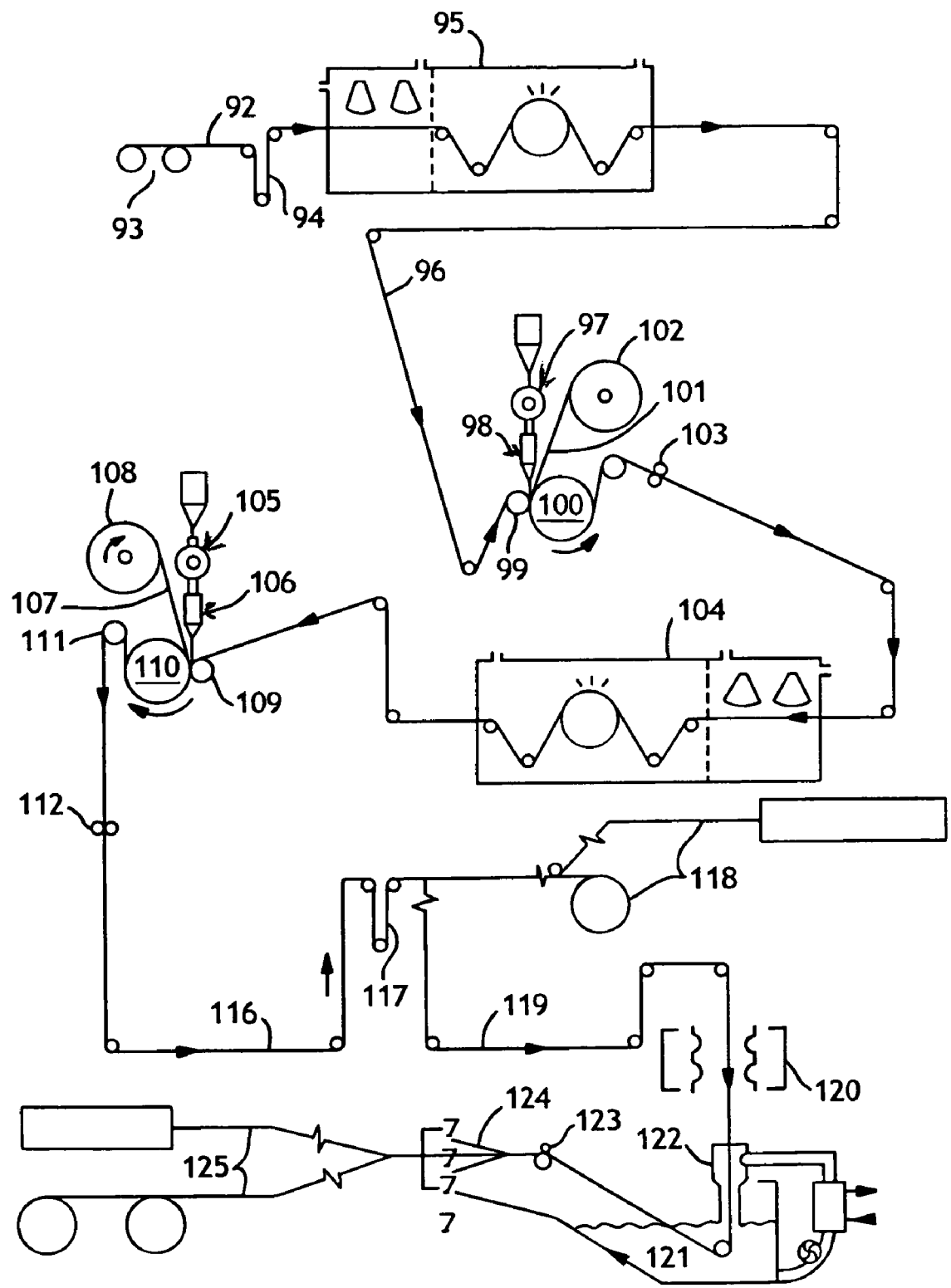
FIG. 6 is a schematic general arrangement view for describing continuous-line apparatus of the invention for carrying out the dual-surface multiple-polymeric-layer processing, with selective steps, of FIG. 5.

Multiple-polymeric-layer coating of each substrate surface and processing step, as described in relation to FIG. 5, are carried out by in-line apparatus shown in the schematic general-arrangement view of FIG. 6. Corrosion-protected continuous strip 92, from uncoiling station 93, is directed through looping pit 94, which provides for uniform feed of strip into the line during change of coils at 93. Activation of a single surface is carried-out in apparatus 95; rows of burners are positioned to impinge open-flame across strip width of that surface, for burning-off surface oils and removal of associated debris, if any. The content of impinging flame is controlled so as to provide an oxidizing-reaction; that is, a loss of surface electrons, from that surface. That oxidizing reaction augments chemical-bonding of a pre-selected organic molten thin-film polymeric material with an activated inorganic corrosion-protected surface. Ionizing gaseous atmosphere, contiguous to that single-surface, by corona-discharge conductors, as shown within surface-activation apparatus 95, helps to activate, and/or to maintain surface activation, for said chemical-bonding. Open flame and corona-discharge treatments on the surface to be activated can also be carried out in combination. However, burn off of surface-lube or debris on the remaining surface, as described earlier, in relation to the single-surface polymeric coated embodiment of FIGS. 1, 4 need not be utilized in the dual-surface polymeric coating embodiment of FIGS. 5 and 6.

Strip 96, with activated surface, travels in-line for polymeric deposition on that single surface. Inventories of polymeric materials for molten-film deposition are preferably maintained in solid pellet form. Pre-selected thermoplastic-polymeric materials, for molten-film extrusion, are supplied, and introduced to heating, melting and pressurizing means 97, as described earlier in relation to FIG. 3. That polymeric material is then directed for continued heating and pressurizing in die structure means 98; that structure provides an elongated width-wise-oriented die opening for downward extrusion of an elongated molten thin-film. Strip 96, with activated surface, is directed for travel around the periphery of roll 99 into a polymeric coating-nip defined by coaction of said roll 99 and temperature-modulating roll 100. In traveling around roll 99, strip 96 presents its single activated surface, in width-wise disposition, for receiving molten thin-film as width-wise extruded, from the elongated die opening of die structure 98; and, such width-wise extrusion extends further to form a polymeric overhang at each lateral edge of the strip.

The thin-film with adhesive characteristics, as extruded into the coating-nip defined between roll 99 and temperature-modulating roll 100, presents an opposed pair of substantially-planar molten surfaces. One molten surface of the extruded film adheres to the activated-surface of strip 96 as the strip is fed into the defined coating nip; and, substantially-simultaneously, the pre-selected solid polymeric-material thin-film 101 is being fed from solid thermoplastic polymeric supply coil 102, into the defined coating-nip for contact with the remaining molten film surface.

Solid film 101, from solid-film supply coil 102, is directed so as to adhere to that remaining molten surface of the extruded thin-film in the defined coating nip. Roll 99 exerts sufficient pressure on the strip, for the molten thin-film to adhere to the activated surface of the strip; and, for the solid-polymeric film 101 to adhere to the remaining planar surface of molten thin-film for continuing in-line travel. The strip with multiple-polymeric layers, as coated in the defined coating nip, travels in-line. The remaining surface of solid-polymeric film 101, opposite to its surface in contact with the molten film, travels in-line in contact with the periphery of temperature-modulating roll 100.

That arrangement provides two coacting sources for heat removal; helping to solidify molten thin-film polymeric material during travel at the coated strip around the periphery of roll 100. Heat from the molten thin-film moves in the direction of, and into, ambient-temperature strip 96. The polymeric material for the molten thin-film is pre-selected to provide sufficient green-strength adherence characteristics for multiple-polymeric layers. Eliminating a heating requirement for the strip contributes significantly to line-speed; and, can help to avoid other heat-removal complications during continuous-line operations. Contact of solid-film 101 with the peripheral surface of temperature-modulating roll 100 helps to remove substantial heat for solidification of the molten film during in-line travel. The external peripheral-contact surface of roll 100 is cooled, by internally-circulating coolant so as to present a peripheral surface temperature substantially less than melt temperature for the polymeric materials, so as to augment desired solidification during travel around roll 100; for example, the periphery of roll 100 can be cooled, as required, to be in a range of about fifty to about one hundred seventy five degrees Fahrenheit (about 10° to 79.4° C.).

Feeding of solid-film 101 from coil 102 is correlated with in-line travel rate of the continuous-strip. The peripheral-contact-area and the surface temperature of roll 100 are selected so as to achieve desired solidification of the extruded thin-film during in-line travel of the solid-film, of the single-surface polymeric-coated strip, in contact with that preselected periphery at the preselected surface temperature The polymeric overhang is also solidified during that in-line travel; and, is removed by directing the strip through edge-trimming means 103, as located in-line; which contributes to achieving uniform thickness of the multi-polymeric layers width-wise of the substrate surface, between its lateral edges.

In the dual-surface polymeric-coating embodiment of FIG. 6, the single-surface polymeric-coated strip travels, from edge-trimming means 103, for surface activation and polymeric coating of its remaining surface. Activation of the remaining surface is carried out at pre-treatment apparatus 104. The latter includes controlled-content flame impingement with selected rows of burners and/or corona discharge units positioned as shown, for selective or combined use in surface activation facilitating chemical-bonding of an organic polymeric material with an inorganic corrosion-protected surface.

The pre-selected thermoplastic-polymeric-material, having adhesive characteristics, is supplied in solid pellet form to extrusion-preparation apparatus 105; that apparatus includes units described in relation to FIG. 3. The pre-selected tie-layer polymeric material is heated, melted, and pressurized therein; and, directed with further heating and pressurizing, into die-structure 106 which presents a width-wise oriented elongated die opening so as to enable thin-film extrusion.

Solid film 107 is directed from solid-film supply coil 108, in a width-wise co-extensive relationship with the molten film, at a rate co-related with the strip travel rate. The thin-film being extruded presents two opposed substantially-planar molten surfaces; and, is directed from an elongated die opening, of structure 106, into a coating nip defined by roll 109 and temperature-modulating roll 110. One molten-surface of the extruded film contacts the activated-surface of the substrate entering into the coating-nip, defined by co-acting roll 109 and temperature-modulating roll 110. Substantially-simultaneously the solid film 107, from supply coil 108, contacts the remaining molten surface of the extruded film as both films and the strip enter the defined coating-nip, as shown in detail in FIG. 3A, for in-line travel circumscribing the surface of temperature-modulating roll 110.

Nominal-pressure is exerted by roll 109 assuring molten-film contact with the activated surface of the substrate and with solid film 107 directed from coil 108, for in-line travel. The diameter of roll 110 is selected, and its peripheral surface is controllably cooled by internally circulating coolant, so as to provide for solidification of the molten-film for continuing bonded travel of the multiple polymeric-layers with coated strip 111, in the direction indicated.

Edge-trimming means 112 removes solidified polymeric overhang from each lateral strip edge during in-line travel. Edge-trimmed strip 116 is directed through looping pit 117, so as to provide an in-line travel rate which provides for preparation for direct shipment at station 118, as polymeric-coated sheared-sheets or as polymeric-coated coils; or, in the alternative, enables directing the strip, with multiple-polymer layers on each surface, for finish-processing.

For finish-processing, the strip with multiple-polymeric-layers on each surface is directed along the alternate travel path 119 of FIG. 6, toward heating-unit 120. The polymeric layers on each surface are preferably heated to a temperature range which enables the polymeric materials to exhibit melt-temperature-characteristics throughout layers on each surface. Heating unit 120 can include high-frequency induction heating means which rapidly concentrates heating on the substrate surface of flat-rolled strip which, in turn, helps to heat the polymeric-layers. That heating is preferably augmented by infra-red surface heating means, located within unit 120, which directs heating through the exterior surface of each polymeric coated surface; that can decrease heat requirements from the metal substrate; which combination can have advantages in heat removal during continuous-line operations. The melt temperature for the polymeric layers extends during in-line travel toward active cooling means; that in-line travel augments bonding of the multiple-polymeric-layer and bonding of the polymeric tie-layer with each substrate surface.

The multiple-polymeric layers on each surface are then rapidly-cooled simultaneously through glass-transition temperature utilizing liquid coolant from quench bath 121. The cooling liquid is maintained at a desired temperature by pumped re-circulation from the bath; and, can include a closed-system heat exchanger, as shown, en-route to re-entry structure 122. That re-entry structure provides laminar flow for quench-bath cooling liquid along each surface of the coated strip. Simultaneous rapid-cooling through glass-transition temperature establishes uniform amorphous characteristics throughout the polymeric materials on each strip surface.

Cooling liquid from strip surfaces is returned to quench bath 121 by wringer rolls 123; and, each surface is dried by blow-dryer-means 124. The dual-surface coated strip of FIG. 6 is directed into transfer-preparation station 125, for preparing work-product for transfer by recoiling or preparing stacks of sheared sheets, for shipment.

Final-processing is utilized for augmenting performance characteristics and fabricating abilities of market usage products. Also, combinations of polymers can be selected for each surface of a dual-surface multiple-polymeric layer coated work product in order to provide desired durability and performance characteristics for each surface, for further selection of market product uses.

Selected market product uses are augmented by the composite-coat selected combinations of selected corrosion-protection, selected thermoplastic extruded thin-film tie layer polymeric material, and the selected solid-film polymeric material for the external surface of a market usage product. Corrosion-protection for the rigid flat-rolled sheet metal of the invention is selected to be capable of being activated for selected polymeric adhesion. Both substrate-surfaces are corrosion-protected for the single-surface polymeric coated embodiment as well as for the dual-surface polymeric-coated embodiment.

Figure 7:
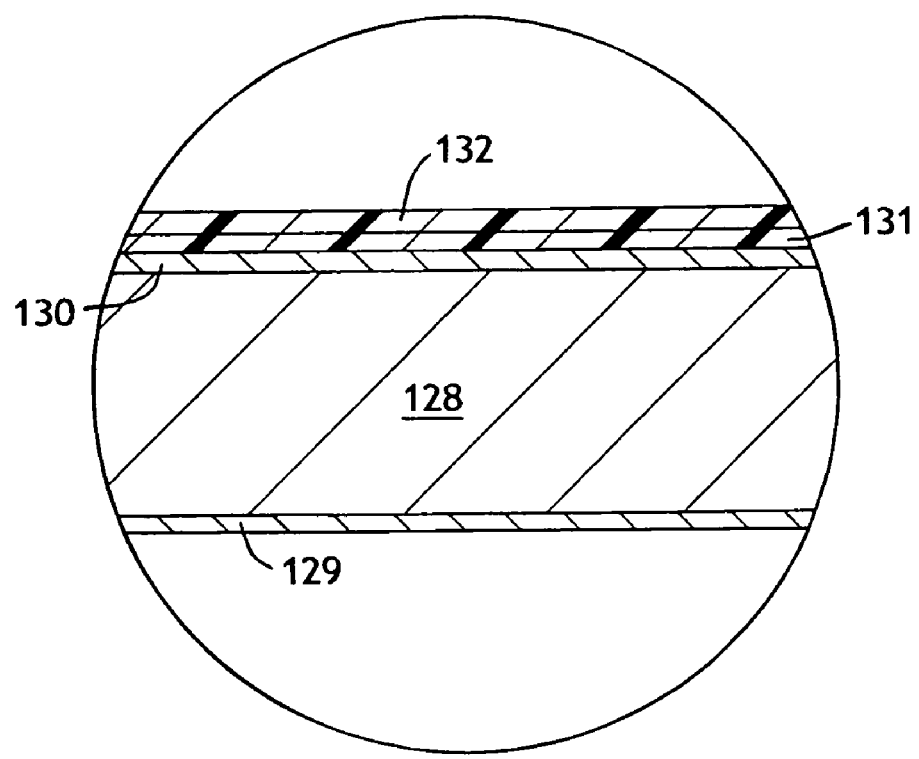
FIG. 7 is an expanded cross-sectional view for describing inorganic corrosion-protected rigid flat-roll sheet metal work-product of the invention with multiple-polymeric-layer coating of a single-surface in accordance with the processing of FIG. 1 and apparatus as described in relation to FIG. 4.

In the expanded cross-sectioned view of FIG. 7, each surface of rigid flat-rolled sheet metal substrate 128 includes inorganic corrosion-protected surface 129, 130. A single-surface of that manufactured work-product is composite-coated, with a layer of extruded tie-layer polymeric film 131 and with an external surface solid-film 132. That is, both substrate surfaces are corrosion-protected and a single-surface is coated with multiple-polymeric layers in that embodiment of a manufacture-work-product of the invention. That work-product also finds particular usage by selecting metal substrate of suitable mechanical properties, including tensile-strength, hardness, and ductility.

Usage of the single polymeric-coated embodiment can include siding and/or roofing for construction; such as: open-front easy-access, three-sided, pole-type sheds for protective storage of farm equipment, road-building equipment, and other such equipment or products; also for in-home appliances, such as washing machines or dryers; and, outdoor appliances such as housings for air conditioners or heat pumps; such appliances generally require coloration only for a single surface. Coloration can be selected for an external surface portion to present desired color for a particular use. External surface coloring can be accomplished by means of solid-film 132 of the polymeric combination; that solid-film can also provide for blocking ultra-violet rays so as to facilitate weather-proofing for such surfaces and external uses.

The interior surfaces of that type of construction are adequately protected by the selected corrosion-protective coating. Flat-rolled low-carbon steel, provides a wide-range of tensile strength and other desired mechanical properties; and, hot-dip zinc spelter coated or electrolytically-applied zinc provide desired corrosion-protection for both interior and exterior construction surfaces. The corrosion-protection prevents substrate surface-oxidation in the event of accidental surface abrasion of the type enabling moisture penetration of polymeric layers.

Flat-rolled mild steel substrate for that pole-type construction can be selected in a thickness range of about 0.01 inches to about 0.25 inch. Zinc-spelter coating is carried out in a hot-dip molten metal bath, coating both surfaces simultaneously during passage through the hot-dip bath. A hot-dip zinc-spelter galvanizing bath can include aluminum in selected percentages ranging from very low to a high percentage of aluminum producing Galvalume™ coating; or, combinations of misch-metal which produce a GALFAN™ coating. Hot-dip galvanizing coatings can extend from about twenty-five to about one hundred fifty $oz/ft^2$, total for both surfaces; also, each surface can be differently coated in that range. Further, light-weight hot-dip zinc spelter coatings can be alloyed with the steel substrate by on-line heating of the hot-dip molten metal coated strip until the zinc-spelter alloys with the steel substrate. Applicable electrolytic zinc coating thicknesses are tabulated later herein.

Figure 8:
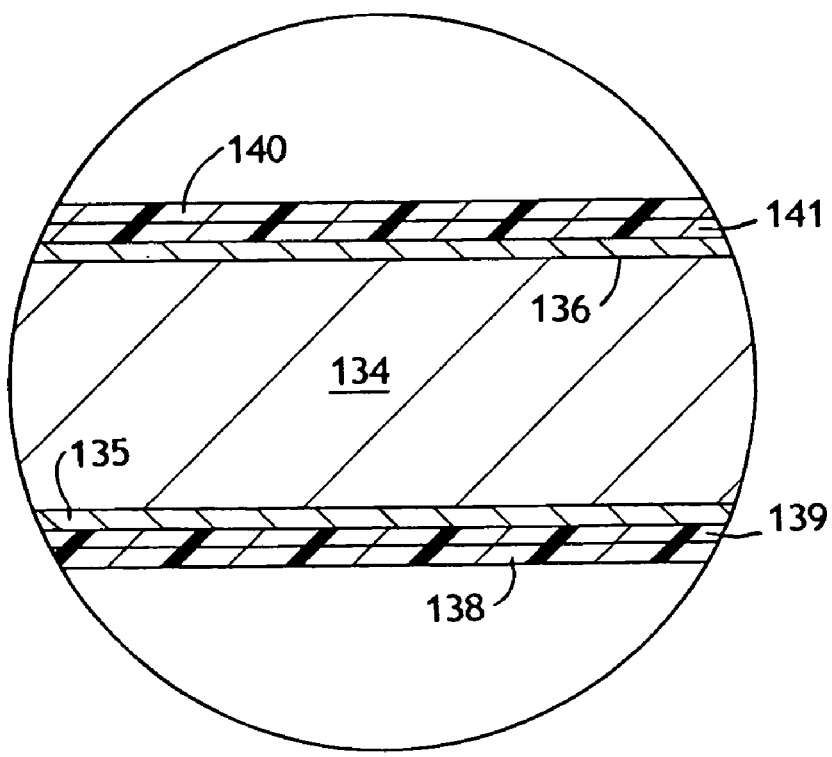
FIG. 8 is an expanded cross-sectional view for describing composite-coated rigid flat-rolled sheet metal work-product of the invention, combining corrosion-protection of both surfaces with multiple-polymeric-layer coating of each surface, in accordance with processing of FIG. 5 and apparatus described in relation to FIG. 6.

FIG. 8 is an expanded cross-sectional view of a composite-coated dual-polymeric coated embodiment of the invention consisting of corrosion protection for each rigid sheet metal substrate surface, and multiple-polymeric layers coated on each substrate surface of flat-rolled sheet metal substrate 134. An inorganic-corrosion-protection coating, respectively 135, 136, covers each respective surface of substrate 134; and, multiple-polymeric layers cover each such corrosion-protected surface. External solid-film polymeric material 138 and extruded molten-thin film polymeric internal material 139 are bonded together; and, the extruded tie-layer is chemically-bonded with corrosion-protective surface 135. On the opposite surface, external solid film polymeric material 140 and extruded tie-layer-film polymeric material 141 are bonded together with the tie-layer chemically-bonded with the corrosion-protective surface 136.

Corrosion-protection on each substrate surface and multiple-polymeric layer protection on each surface provides work product for additional market-uses; including: outdoor or indoor building construction units, such as: doors, door and window framing, heavy-duty paneling, selected vehicular panels, and sheet-metal-constructed framing units including column and beam applications. Multiple-polymeric-layers help to provide auditory insulating properties for office and residential buildings, as well as providing for offsetting temperature differentials between interior and exterior walls of such buildings.

Corrosion-protection for low-carbon steel can include a non-ferrous metallic protective coating on each opposed surface of the steel substrate, as tabulated below; coating weight for electrolytic tinplate is measured in pounds per base box (lb/BB) in which a base box is equal to 31,360 square inches.

| Steel Thickness | Corrosion Protection | Coating |
|---|---|---|
| about .004" to about .015" | electrolytic plated tin | about .025 to about 1.35 lb/bb |
| same | chrome/chrome oxide (TFS) electrolytic plated chrome: and chrome oxide | about 3 to 13 mg/ft$^2$ about .7 to 2.5 mg/ft$^2$ |
| same | cathodic dichromate treatment | about 50 mg/ft$^2$ to about 600 mg/ft$^2$ |
| same | electrolytic plated zinc | about .025 oz/ft$^2$ to about .175 oz/ft$^2$ |

Aluminum thickness can be selected in a thickness range of about 0.005 inch to about 0.25 inch, with an aluminum oxide conversion coating thickness of about fifty to about six hundred micrograms per square foot. Dual-surface multiple-polymeric layer coated flat-rolled aluminum can be used, for example, for on-site forming of rain gutters for residential and commercial buildings for storing materials and/or equipment; and, for other construction uses calling for light-weight protected sheet metal with differing surface coloration on each surface.

Aluminum/magnesium alloy can be selected in a thickness range of about 0.005" to about 0.2", with conversion coating in a range of about fifty to about six hundred micrograms per square foot, for fabricating market-usage products calling for light-weight, rigidity and tensile strength for market uses, such as: ladders, scaffolding; and, with increased thickness of aluminum-magnesium alloy to about 0.5 inch for heavy-duty housings and vehiclular framing components.

Solid-film polymeric materials are selected in a thickness range from above 0.0005" to about 0.006" with extruded molten thin-film tie-layers selected in a range from above 10% to about 50% of the solid film thickness; sufficient thickness for selected molten film is maintained for bonding the solid film to a rigid sheet metal activated-substrate surface.

Thermoplastic polymeric material for the extruded molten layer is pre-selected for desired adhesive characteristics and green-strength for bonding with an activated metallic-substrate surface, which is free of a heating requirement and, also bonding with a pre-selected solid-film polymeric material providing green-strength for in-line travel, of both films. Ambient-temperature for substrate, for example, is in a range of about seventy degrees to about one hundred degrees Fahrenheit; that is, without a heating requirement for the substrate.

Molten-film polymeric materials of said adhesive characteristics are selected from the following:
(i) maleic-anhydride modified polypropylene,
(ii) maleic anhydride modified low density polyethylene,
(iii) ethylene acrylate acid-modified with an anhydride,
(iv) ethyl methacrylate copolymer, acid-modified, such as with maleic anhydride, and
(v) maleic-anhydride modified terpolymer.

The solid-film polymeric material, for bonding with a pre-selected molten thin-film, is selected from the following:
(i) polypropylene
(ii) a polyester selected from the group consisting of
  (a) PET
  (b) PBT, and
  (c) combinations of PET and PBT,
(iii) polycarbonates,
(iv) polyamides,
(v) polyethylenes,
(vi) polyvinylidene, fluoride (PVDF),
(vii) polyvinylidene fluoride/polycrylic combinations, and
(viii) polyvinyl fluorides (PVF).

Polymeric materials are available from
1. E.I. du Pont de Nemours and Company
Barley Mill Plaza
Wilmington, Del. 19880-0026
2. Eastman Chemical Company
100 North Eastman Road
P.O. Box 511
Kingsport, Tenn. 37662-5075
3. ATOFINA Chemicals, Inc.
2000 Market Street
Philadelphia, Pa., 19103-3222
4. Valspar/Engineered Polymer Solutions
1400 N. State Street
Marengo, Ill. 60152
5. Oxy Vinyl, Inc.
5005 LBJ Freeway
Dallas, Tex. 75244
6. Basell USA
2801 Centerville Road
Wilmington, Del.
7. Bayer Corporation
100 Bayer Road
Pittsburgh, Pa. 15205-9744

Open-flame burners, to size specifications for the line, can be ordered from:
Flynn Burner Corporation
425 Fifth Avenue
(P.O. Box 431)
New Rochelle, N.Y. 10802

Corona discharge conductors can be ordered to specifications from:
Enercon Industries Corp.
W140 N9572 Fountain Boulevard
Menomonee Falls, Wis. 53052

While specific combinations of materials, dimensional values, method steps, products, and apparatus have been set forth for purposes of disclosing specific embodiments of the invention, it should be noted that in the light of those teachings, others skilled in the art are better positioned to use those teachings to devise method-steps and apparatus, combinations of materials, and quantitative values which vary only slightly from those specified for purposes of disclosure of specific workable embodiments of the invention; and, that such slight variations are available because of present teachings, as disclosed herein. Therefore, for purposes of construing the language of the appended claims, reference should be made to the above teachings of the invention and to the capabilities and functions resulting from the combinations described, for evaluating the scope of patentability of the subject matter recited in each of the claims.

What is claimed is:
1. Continuous-line polymeric coating operations for a single surface of rigid flat-rolled sheet metal substrate, comprising the steps of:
(A) supplying elongated rigid flat-rolled sheet metal continuous-strip substrate selected from the group consisting of
  (i) flat-rolled low-carbon steel,
  (ii) flat-rolled aluminum, and
  (iii) flat-rolled aluminum-magnesium alloy
traveling in-line in the direction of its length, presenting a pair of opposed substantially-planar corrosion-protected external metallic surfaces, extending width-wise between longitudinally-extending lateral edges of said substrate;
  (B) activating a single corrosion-protected metallic surface of said substrate for polymeric coating adhesion, while traveling in-line, by selecting from the group consisting of
    (i) impinging controlled content open-flame across said single metallic surface between said lateral edges for producing an oxidizing-reaction loss of electrons from said metallic surface,
    (ii) establishing corona discharge across said single metallic surface, ionizing gas contacting said single metallic surface resulting in loss of electrons from said single metallic surface, and
    (iii) combinations of (a) and (b), in any sequence; while
    (iv) providing for optionally electing to cleanse said remaining metallic surface of surface oil and associated debris, as deemed helpful in avoiding surface contamination in preparing work-product for shipment;
  (C) supplying to said continuous-line operations thermoplastic polymeric material in the form of a solid-film, by pre-selecting said solid-film from the group consisting of
    (i) polypropylene,
    (ii) a polyester selected from the group consisting of
      (a) PET
      (b) PBT, and
      (c) a combination of PET and PBT,
    (iii) polycarbonates,
    (iv) polyamides,
    (v) polyethylenes,
    (vi) polyvinylidene fluoride (PVDF),
    (vii) a polyvinylidene fluoride/polyacrylic combination, and
    (viii) polyvinyl fluoride (PVF);
  (D) pre-selecting thermoplastic polymeric material having adhesive characteristics from the group consisting of
    (i) maleic-anhydride modified polypropylene,
    (ii) maleic anhydride modified low density polyethylene,
    (iii) ethylene acrylate acid-modified with an anhydride, and
    (iv) ethyl methacrylate copolymer, acid-modified,
  (E) preparing said thermoplastic polymeric material having adhesive characteristics by heating, melting and pressurizing for introducing as molten thin-film into said continuous-line polymeric-coating operations;
  (F) extruding said molten thin-film presenting a pair of substantially-planar opposed molten-film surfaces for associating multiple-polymeric-layers for in-line travel with said activated metallic surface during said continuous-line polymeric-coating operations;
  (G) directing travel of said rigid sheet metal continuous-strip substrate at ambient temperature for said in-line polymeric-coating operations, by
    (i) presenting the single activated metallic surface, of said substrate, as directed for in-line travel, for direct surface-to-surface bonding with one of said pair of molten film surfaces as extruded into said in-line polymeric-coating operations, while
    (ii) substantially-simultaneously directing said pre-selected polymeric solid-film for bonding with the remaining surface of said pair of molten thin-film surfaces, as extruded; with
    (iii) said bonding, on each of said pair of molten-film surfaces, being carried-out, by
      (a) depositing said molten thin-film to extend width-wise across and bond in direct surface-to-surface contact with said activated metallic surface, and, further to form a polymeric-overhang at each said lateral edge,
      (b) depositing said solid-film width-wise co-extensively with the remaining molten-surface of said pair of molten thin-film surfaces,
      (c) forming combined polymeric layers extending overhang beyond each said respective lateral edge of said substrate;
  (H) correlating feed rate of said solid-film with in-line travel rate of said substrate, while
  (I) coordinating quantitative extrusion of said molten film, to enable
  (J) establishing said multiple-polymeric layers and overhang, traveling in-line as associated with said single activated metallic surface of said substrate by said molten-film;
  (K) solidifying said molten-film polymeric layer during continuing in-line travel of said multiple-polymeric-layer coated substrate in the direction of its length, including
    (i) removing heat from said molten-film by contacting said activated metallic surface of said substrate which is being directed in-line free of a heating requirement,
    (ii) removing heat by said solid-film contacting a controlled temperature-modulating roll peripherally as directed for in-line travel with said multiple-polymeric layers, and
    (iii) internally cooling said temperature-modulating roll for said peripheral travel;
  (L) trimming solidified polymeric-overhang from each said lateral edge of said substrate; and
  (M) directing said substrate for selecting from the group consisting of
    (i) preparing for direct transfer from said polymeric-coating operations, and
    (ii) carrying-out finish-processing of said single-surface multiple-polymeric-layer coated substrate, before directing for transfer; with
    (iii) said finish-processing, including
      (a) heating said multiple-polymeric-layers on said single-surface polymeric-coated substrate for achieving melt temperature characteristics in said polymeric layers,
      (b) continuing in-line travel of said substrate as heated in the direction of its length, for
      (c) implementing coverage of said corrosion-protected topography and augmenting bonding of said multiple-polymeric-layers, then
      (d) rapidly-cooling said multiple-polymeric-layers, through glass-transition-temperature, resulting in
      (e) establishing amorphous characteristics in said multiple-polymeric-layers, while also
      (f) cooling said continuous-strip substrate; then
  (N) directing said single-surface finish-processed multiple-polymeric-layer-coated substrate for preparation for transfer from said polymeric-coating continuous-line operations.

2. Continuous-line polymeric-coating of both surfaces of elongated flat-rolled sheet metal substrate, comprising the steps of:

(A) supplying elongated rigid flat-rolled sheet metal continuous-strip substrate selected from the group consisting of
  (i) flat-rolled low-carbon steel,
  (ii) flat-rolled aluminum, and
  (iii) flat-rolled aluminum-magnesium alloy traveling in-line in the direction of its length, presenting a pair of substantially-planar opposed corrosion-protected external metallic surfaces, extending width-wise between longitudinally-extending lateral edges of said substrate;
(B) activating a single metallic surface, of said pair of corrosion-protected metallic surfaces while said continuous-strip substrate is traveling in-line, for polymeric adhesion, by selecting from the group consisting of
  (i) impinging controlled-content open-flame, across said single metallic surface providing an oxidizing reaction with loss of electrons from said single metallic surface,
  (ii) establishing corona discharge across said single metallic surface, ionizing gas acting on said single metallic surface resulting in loss of electrons from said single metallic surface, and
  (iii) combinations of (i) and (ii) above, in any sequence;
(C) pre-selecting thermoplastic polymeric-material as supplied in the form of a solid film, from the group consisting of
  (i) polypropylene,
  (ii) a polyester selected from the group consisting of
    (a) PET
    (b) PBT, and
    (c) a combination of PET and PBT,
  (iii) polycarbonates,
  (iv) polyamides,
  (v) polyethylenes,
  (vi) polyvinylidene fluoride (PVDF),
  (vii) a polyvinylide fluoride/polyacrylic combination, and
  (viii) polyvinyl fluoride (PVF);
(D) pre-selecting thermoplastic polymeric material, having adhesive characteristics, from the group consisting of
  (i) maleic-anhydride modified polypropylene,
  (ii) maleic anhydride modified low density polyethylene,
  (iii) ethylene acrylate acid-modified with an anhydride, and
  (iv) ethyl methacrylate copolymer, acid-modified, capable of
    (a) extruding as a molten thin-film extending width-wise and beyond lateral edges of said continuous-strip substrate, presenting a pair of substantially-planar, opposed molten film surfaces, with each having
    (b) adherence characteristics for direct surface-to-surface bonding one of said pair of molten film surfaces with said single activated metallic surface, free of requirement for heating said substrate surface, and
    (c) bonding the remaining molten film surface, of said pair, with said pre-selected polymeric material solid-film;
(E) preparing said pre-selected polymeric material having adhesive characteristics by heating and pressurizing for extruded introduction of said molten thin-film for said in-line polymeric-coating operations;
(F) directing travel of said continuous-strip substrate, with said substrate surface at ambient temperature, while positioning said single activated metallic surface for polymeric coating;
(G) extruding said pre-selected thermoplastic polymeric material having adhesive characteristics as a molten thin-film, presenting said pair of substantially-planar opposed molten surfaces, with
  (i) one of said pair of molten surfaces bonding into direct surface-to-surface contact with and adhering to said single activated metallic surface, across strip width, and extending further,
  (ii) forming a polymeric overhang along each lateral edge of said continuous-strip substrate, while said continuous-strip substrate is traveling in-line;
(H) substantially-simultaneously feeding said pre-selected polymeric material solid-film, in the direction of its length, co-extensively width-wise with said molten thin-film,
  (i) correlating feed of said solid-film in the direction of its length with travel rate of said continuous-strip substrate in the direction of its length, while
  (ii) coordinating quantitative extrusion of said molten film,
  (iii) establishing contact of said solid-film with the remaining surface of said pair of molten surfaces,
  (iv) extending co-extensively with said extruded thin film forming polymeric overhang at each lateral-edge of said substrate, while
    (a) bonding one surface, of said pair of said pair of molten surfaces as extruded, with said single activated metallic surface,
    (b) bonding the remaining of said pair of molten surfaces having adhesive characteristics with said solid-film across strip width, and, extending further,
    (c) forming a combined multiple-polymeric-layer overhang at each lateral edge of said continuous-strip substrate;
(I) solidifying said molten thin-film during travel of said multiple-polymeric-layers associated with said single activated corrosion-protected metallic surface;
(J) trimming solidified polymeric overhang from each lateral edge of said continuous-strip substrate, while said continuous-strip substrate is traveling in-line;
(K) activating the remaining surface of said pair of opposed corrosive-protected metallic surfaces of said continuous-strip substrate, while said continuous-strip substrate is traveling in the direction of its length, with said surface activation being carried out as set forth in Paragraph (B) above;
(L) pre-selecting a solid-film polymeric material from the group set forth in Paragraph (C) above;
(M) pre-selecting a thermoplastic polymeric material, having adhesive characteristics, from the group set forth in Paragraph (D) above;
(N) preparing said pre-selected thermoplastic polymeric material, having adhesive characteristics, as set forth in Paragraph (E) above for molten thin-film extrusion;
(O) controlling travel and positioning of said activated metallic surface of said continuous-strip substrate for polymeric coating, free of a heating requirement for said substrate as set forth in Paragraph (F);
(P) extruding said pre-selected thermoplastic polymeric material having adhesive characteristics as a molten thin-film, presenting a pair of substantially-planar opposed molten surfaces, as set forth in Paragraph (G)

above, extending across width of said remaining corrosion-protected metallic surface, and further forming a polymeric overhang at each lateral edge of said continuous-strip substrate, of said remaining surface;

(Q) substantially-simultaneously feeding said polymeric solid film for contact with the remaining surface, of said pair of opposed molten surfaces, while correlating feed of said solid film with travel rate of said continuous-strip substrate, and coordinating feed of molten thin-film, establishing multiple-polymeric-layers as set forth in Paragraph (H) above on said remaining activated metallic surface;

(R) solidifying said molten thermoplastic extruded thin-film during travel in-line associated with said remaining activated metallic surface of said continuous-strip substrate, as set forth in Paragraph (I) above;

(S) trimming said polymeric overhang, formed as set forth in Paragraph (H) above, from each lateral edge of said continuous-strip substrate while continuing travel in the direction of its length, as set forth in Paragraph (J) above;

(T) selecting from the group consisting of
  (i) preparing said dual-surface polymeric-coated continuous-strip substrate for transfer, and
  (ii) directing said dual-surface polymeric-coated continuous-strip substrate for finish processing;
in which, said finish-processing includes
  (a) simultaneously heating said polymeric layers on establishing melt temperature characteristics for said layers on each respective surface,
  (b) continuing in-line travel of said continuous-strip substrate, before initiating cooling, while melt characteristics exist in said multiple-polymeric layers, for
  (c) augmenting bonding of each said polymeric layers with each respective continuous-strip substrate metallic surface and bonding within said multiple-polymeric-layers on each said opposed metallic surface of said continuous-strip substrate, then
  (d) rapidly-cooling said polymeric layers on each respective metallic surface of said continuous-strip substrate through glass-transition-temperature, while also cooling said continuous-strip substrate, utilizing a quench-bath liquid, resulting in
  (e) simultaneously establishing amorphous characteristics in said multiple-polymer layers on each respective substrate metallic surface, then
  (f) directing said finish-processed dual-surface multiple-polymeric-layer coated continuous-strip substrate for preparing for transfer.

3. The process of claim 1, wherein:
(a) said flat-rolled low-carbon steel includes a non-ferrous metallic corrosion-protective coating defining the opposed surfaces of such steel substrate, selected from the group consisting of
  electrolytically-plated tin,
  electrolytically-plated chrome/chrome oxide,
  electrolytically-plated cathodic dichromate,
  dip-coated cathodic dichromate,
  electrolytically-plated zinc, and
  hot-dip coated zinc spelter;
(b) said flat-rolled aluminum includes corrosion-protection selected from the group consisting of
  chemical treatment conversion-coating,
  electrochemical conversion-coating,
  chromadizing, and
  chromate treatment; and
(c) said flat-rolled aluminum/magnesium alloy includes corrosion-protection selected from the group consisting of
  aluminum oxide,
  conversion-coating,
  chromadizing, and
  chromate treatment.

4. The process of claim 2, wherein:
(a) said low-carbon steel includes a non-ferrous corrosion-protective coating defining the opposed surfaces of such steel substrate, selected from the group consisting of
  electrolytically-plated tin,
  electrolytically-plated chrome/chrome oxide,
  electrolytic-plated cathodic dichromate,
  dip-coated cathodic dichromate treatment,
  electrolytically-plated zinc, and
  hot-dip coated zinc spelter;
(b) said flat-rolled aluminum corrosion-protection selected from the group consisting of
  aluminum oxide,
  conversion-coating,
  chromadizing, and
  chromate treatment; and
(c) said flat-rolled aluminum/magnesium alloy includes corrosion-protection selected from the group consisting of
  chemical conversion coating,
  electrochemical conversion-coating,
  chromadizing, and
  chromate treatment.

5. A process for coating a single surface of a metal sheet, comprising:
(A) in-line transporting a metal sheet having a corrosion-protection coating, a first metallic surface of the corrosion-protection coating and an opposite substantially planar second surface each extending between opposite lateral edges of the metal sheet;
(B) activating the first metallic surface of the metal sheet to enhance reception and retention of a multi-layer polymeric coating on the activated first metallic surface;
(C) melt extrusion depositing a thermoplastic molten thin film having adhesive characteristics directly on and into surface-to-surface contact with the activated first metallic surface, and beyond the opposite lateral edges while presenting the activated first metallic surface in a temperature range of about 75° F. to about 150° F., the molten thin film selected from the group consisting of maleic-anhydride modified polypropylene, maleic anhydride modified low density polyethylene, anhydride-modified ethylene acrylate acid, and acid-modified ethyl methacrylate copolymer;
(D) substantially simultaneously with said melt extrusion depositing step (C), bonding a thermoplastic solid film on an available surface of the molten thin film co-extensively with the molten thin film to establish a single-surface coated metal sheet comprising the multi-layer polymeric coating having overhang portions extending beyond the opposite lateral edges of the metal sheet, the solid film selected from the group consisting of polypropylene, polybutylene terephthalate (PBT), polyethylene terephthalate (PET), a combination of PET and PBT, polycarbonates, polyamides, polyethylene, polyvinylidene fluoride (PVDF), a combination of polyvinylidene fluoride and a polyacrylic, and polyvinyl fluoride (PVF);
(E) solidifying the multi-layer polymer coating, including the overhang portions; and (F) trimming the overhang portions from the lateral edges of the single-surface coated metal sheet.

6. The process of claim 5, further comprising:
(G) subjecting the single-surface coated metal sheet to finish-treatment, comprising heating the multi-layer polymeric coating for achieving melt temperature characteristics therein, then cooling the multi-layer polymeric coating through a glass-transition temperature thereof at a sufficiently rapid rate to establish amorphous non-directional characteristics in the multi-layer polymeric coating of the single-surface coated metal sheet.

7. The process of claim 5, wherein the metal sheet is selected from the group consisting of flat-rolled low-carbon steel, flat-rolled aluminum, and flat-rolled aluminum-magnesium alloy.

8. The process of claim 7, wherein:
(a) the corrosion protection coating of the flat-rolled low-carbon steel is a non-ferrous metallic corrosion-protective coating selected from the group consisting of electrolytically-plated tin, electrolytically-plated chrome/chrome oxide, electrolytically-plated cathodic dichromate, dip-coated cathodic dichromate, electrolytically-plated zinc, and hot-dip coated zinc spelter;
(b) the corrosion protection coating of the flat-rolled aluminum is selected from the group consisting of chemical treatment conversion-coating, electrochemical conversion-coating, chromadizing, and chromate treatment; and
(c) the corrosion protection coating of the flat-rolled aluminum/magnesium alloy is selected from the group consisting of aluminum oxide, conversion-coating, chromadizing, and chromate treatment.

9. The process of claim 5, wherein said activating step (B) comprises a member selected from the group consisting of:
(i) impinging a controlled content open-flame across the first metallic surface between the lateral edges for producing an oxidizing reaction loss of electrons from the first metallic surface;
(ii) establishing corona discharge across the first metallic surface, ionizing gas contacting the first metallic surface resulting in loss of electrons from the first metallic surface; and
(iii) a combination of (i) and (ii), in any sequence.

10. The process of claim 9, wherein said activating step (B) further comprises cleansing the second metallic surface of surface oil and associated debris.

11. The process of claim 5, further comprising correlating feed rate of the solid film with an in-line travel rate of the metal sheet.

12. The process of claim 11, further comprising coordinating quantitative extrusion of the molten thin film.

13. The process of claim 5, wherein said solidifying step (E) comprises removing heat from the molten thin film by contacting the molten thin film with the metal sheet, and peripherally contacting the multi-layer polymeric coating with an internally cooled, in-line temperature-modulating roll.

14. The process of claim 5, further comprising:
(G) directing the metal sheet with the polymeric coating for assembly in a form suitable for transfer.

15. A process for coating dual surfaces of a metal sheet, comprising:
(A) in-line transporting a metal sheet having corrosion-protected, opposite substantially planar first and second metallic surfaces each extending between opposite lateral edges of the metal sheet;
(B) activating the first metallic surface of the metal sheet to enhance reception and retention of a first multi-layer polymeric coating on the activated first metallic surface;
(C) melt extrusion depositing a thermoplastic first molten thin film having adhesive characteristics directly on and into surface-to-surface contact with the activated first metallic surface, and beyond the opposite lateral edges while presenting the activated first metallic surface in a temperature range of about 75° F. to about 150° F., the first molten thin film selected from the group consisting of maleic-anhydride modified polypropylene, maleic anhydride modified low density polyethylene, anhydride-modified ethylene acrylate acid, and acid-modified ethyl methacrylate copolymer;
(D) substantially simultaneously with said melt extrusion depositing (C), bonding a thermoplastic first solid film on an available surface of the first molten thin film co-extensively width-wise with the first molten thin film to establish the first multi-layer polymeric coating having first overhang portions extending beyond the opposite lateral edges of the metal sheet, the first solid film selected from the group consisting of polypropylene, polybutylene terephthalate (PBT), polyethylene terephthalate (PET), a combination of PET and PBT, polycarbonates, polyamides, polyethylene, polyvinylidene fluoride (PVDF), a combination of polyvinylidene fluoride and a polyacrylic, and polyvinyl fluoride (PVF);
(E) solidifying the first multi-layer polymer coating, including the first overhang portions;
(F) trimming the first overhang portions from the lateral edges;
(G) activating the second metallic surface of the metal sheet to enhance reception and retention of a second multi-layer polymeric coating on the activated second metallic surface;
(H) melt extrusion depositing a thermoplastic second molten thin film having adhesive characteristics directly on and into surface-to-surface contact with the activated second metallic surface, and beyond the opposite lateral edges while presenting the activated second metallic surface in a temperature range of about 75° F. to about 150° F., the second molten thin film selected from the group consisting of maleic-anhydride modified polypropylene, maleic anhydride modified low density polyethylene, anhydride-modified ethylene acrylate acid, and acid-modified ethyl methacrylate copolymer;
(I) substantially simultaneously with said melt extrusion depositing (H), bonding a thermoplastic second solid film on an available surface of the second molten thin film co-extensively width-wise with the second molten thin film to establish the second multi-layer polymeric coating having second overhang portions extending beyond the opposite lateral edges of the metal sheet, the second solid film selected from polypropylene, polybutylene terephthalate (PBT), polyethylene terephthalate (PET), a combination of PET and PBT, polycarbonates, polyamides, polyethylene, polyvinylidene fluoride (PVDF), a combination of polyvinylidene fluoride and a polyacrylic, and polyvinyl fluoride (PVF);
(J) solidifying the second multi-layer polymer coating, including the second overhang portions; and
(K) trimming the second overhang portions from the lateral edges.

16. The process of claim 15, further comprising:
(L) subjecting the coated metal sheet to finish-treatment, comprising heating the multi-layer polymeric coatings for achieving melt temperature characteristics therein, then cooling the multi-layer polymeric coatings through a glass-transition temperature thereof at a sufficiently rapid rate to establish amorphous non-directional characteristics in the multi-layer polymeric coatings.

17. The process of claim 15, wherein the metal sheet is selected from the group consisting of flat-rolled low-carbon steel, flat-rolled aluminum, and flat-rolled aluminum-magnesium alloy.

18. The process of claim 17, wherein:
   (a) the flat-rolled low-carbon steel includes a non-ferrous metallic corrosion-protective coating defining the opposed metallic surfaces thereof selected from the group consisting of electrolytically-plated tin, electrolytically-plated chrome/chrome oxide, electrolytically-plated cathodic dichromate, dip-coated cathodic dichromate, electrolytically-plated zinc, and hot-dip coated zinc spelter;
   (b) the flat-rolled aluminum includes corrosion-protection selected from the group consisting of chemical treatment conversion-coating, electrochemical conversion-coating, chromadizing, and chromate treatment; and
   (c) the flat-rolled aluminum/magnesium alloy includes corrosion-protection selected from the group consisting of aluminum oxide, conversion-coating, chromadizing, and chromate treatment.

19. The process of claim 15, wherein said activating steps (B) and (G) comprise a member selected from the group consisting of:
   (i) impinging a controlled content open-flame across the first and second metallic surfaces between the lateral edges for producing an oxidizing reaction loss of electrons from the first and second metallic surfaces;
   (ii) establishing corona discharge across the first and second metallic surfaces, ionizing gas contacting the first and second metallic surfaces resulting in loss of electrons from the first and second metallic surfaces; and
   (iii) a combination of (i) and (ii), in any sequence.

20. The process of claim 15, further comprising correlating feed rate of the first and second solid films with an in-line travel rate of the metal sheet.

21. The process of claim 20, further comprising coordinating quantitative extrusion of the molten thin films.

22. The process of claim 15, wherein said solidifying steps (E) and (J) comprise removing heat from the molten thin films by contacting the molten thin films with the metal sheet, and peripherally contacting each of the multi-layer polymeric coatings with an internally cooled, in-line temperature-modulating roll.

23. The process of claim 15, further comprising:
   (N) directing the metal sheet with the polymeric coatings for assembly in a form suitable for transfer.

24. A process for coating a single surface of a metal sheet, comprising:
   (A) in-line transporting a metal sheet having a metallic first surface and an opposite substantially planar second surface;
   (B) melt extrusion depositing a thermoplastic molten film having adhesive characteristics directly on and into surface-to-surface contact with the metallic first surface, the molten film selected from the group consisting of maleic-anhydride modified polypropylene, maleic anhydride modified low density polyethylene, anhydride-modified ethylene aerylate acid, and acid-modified ethyl methacrylate copolymer;
   (C) substantially simultaneously with said melt extrusion depositing step (B), bonding a thermoplastic solid film on an available surface of the molten film co-extensively with the molten film to establish a single-surface coated metal sheet comprising the multi-layer polymeric coating, the solid film selected from the group consisting of polypropylene, polybutylene terephthalate (PBT), polyethylene tereplithalate (PET), a combination of PET and PBT, polycarbonates, polyamides, polyethylene, polyvinylidene fluoride (PVDF), a combination of polyvinylidene fluoride and a polyacrylic, and polyvinyl fluoride (PVF); and
   (D) solidifying the multi-layer polymer coating.

* * * * *